United States Patent [19]
Inoguchi et al.

[11] Patent Number: 5,655,033
[45] Date of Patent: Aug. 5, 1997

[54] METHOD FOR EXTRACTING CORRESPONDING POINT IN PLURAL IMAGES

[75] Inventors: Kazutaka Inoguchi, Kawasaki; Katsumi Iijima, Hachioji; Katsuhiko Mori, Kawasaki, all of Japan

[73] Assignee: Canon Kabushiki Kaisha, Tokyo, Japan

[21] Appl. No.: 261,993

[22] Filed: Jun. 17, 1994

[30] Foreign Application Priority Data

Jun. 21, 1993 [JP] Japan ................................. 5-149302

[51] Int. Cl.⁶ .................................................... G06K 9/20
[52] U.S. Cl. ........................................... 382/293; 382/276
[58] Field of Search ................................. 382/154, 276, 382/278, 291, 293; 356/2; 250/558, 206.2; 364/525

[56] References Cited

U.S. PATENT DOCUMENTS

| | | | |
|---|---|---|---|
| 3,726,591 | 4/1973 | Helava et al. | 356/2 |
| 3,783,294 | 1/1974 | Koper | 250/558 |
| 4,802,759 | 2/1989 | Matsumoto et al. | 364/560 |
| 4,825,393 | 4/1989 | Nishiya | 382/154 |
| 4,942,411 | 6/1989 | Wood | 356/2 |
| 5,390,024 | 2/1995 | Wright | 356/2 |

*Primary Examiner*—Yon J. Couso
*Attorney, Agent, or Firm*—Morgan & Finnegan L.L.P.

[57] ABSTRACT

This invention provides a method of extracting corresponding points from plural images with improved reliability and with a shortened process time. In the method of this invention, the extraction of the corresponding points in plural images is achieved by determining the right-side epipolar line, on which the corresponding points should be positioned, by calculation, and transferring candidate corresponding points, obtained on the right-side image by a conventional method for extracting the corresponding points, onto the points of shortest distance on thus determined right-side epipolar line.

5 Claims, 27 Drawing Sheets

METHOD FOR EXTRACTING CORRESPONDING POINT IN PLURAL IMAGES

BACKGROUND OF THE INVENTION

1. Field of the Invention

The present invention relates to a method for extracting a corresponding point in plural images, and more particularly a method for extracting corresponding points in plural images by obtaining a parallax line through a local calculation involving excitatory and inhibitory couplings based on real pixels of plural images, at each crossing point on a parallax image formed by plural epipolar lines respectively extracted from the plural images.

2. Related Background Art

As the image processing technology employing multiple-eye image taking system, there are already known a method of extracting three-dimensional information based on trigonometry, and a method of synthesizing a high precision image. Such method of synthesizing a high precision image for example utilizes, for attaining a higher resolution:

(1) a method of increasing the resolution spatially by swinging a solid-state image pickup device;

(2) a method of dividing the entering light, taking portions of the object image respectively with plural solid-state image pickup devices and synthesizing these areas; and (3) a method of utilizing an optical shift by double refraction. However, any of these methods (1) to (3) depends on the time-spatial division of the entering light, and result in a loss as to the S/N ratio. For this reason, the present inventors have proposed a method of obtaining a higher resolution utilizing already known two image pickup devices, and a method of forming a high fine image from two images taken from different angles. The method of obtaining a high fine image can be divided into:

(1) a process of estimating the corresponding relationship of the images to input a value into each corresponding position; and (2) a process of transformation from the pixels, obtained with aberrations by the above-mentioned process (1), into a form as if obtained with sampling at equal distances (as if obtained with an image pickup device of a high resolution).

Among these, the process (1) can be considered as equivalent to the extraction of corresponding points in the stereoscopic method with both eyes.

FIG. 18 is a view showing the principle of trigonometry utilized for obtaining an image at a distance. In the following description, the sensors of the right-side camera and of the left-side camera are assumed to be positioned on positive planes, unless otherwise specified.

Trigonometry is used, by taking the images of an object in three-dimensional space with two (right- and left-side) cameras, to determine the three-dimensional coordinate of a point P on the object. From the projection points $P_R$, $P_L$ thereof respectively on the sensor planes $A_{SR}$, $A_{SL}$ of the right- and left-side cameras, having center points $O_R$, $O_L$ of the respective lenses thereof. In the following description, following definitions will be used for:

(1) "Baseline B" is defined by a line connecting the center points $O_R$ and $O_L$ of the lenses of the right- and left-side cameras;

(2) "Baseline length $L_B$" is defined by the length of the baseline B;

(3) "Epipolar plane Ae" is defined by a plane formed by connecting the point P on the object and the projection points $P_R$ and PL; and (4) "Epipolar line (visual axis image) $L_{eR}$" is defined by the crossing line of the epipolar plane Ae and the sensor plane $A_{SR}$ of the right-side camera, and "Epipolar line $L_{eL}$" is defined by the crossing line of the epipolar plane Ae and the sensor plane $A_{SL}$ of the left-side camera.

As shown in FIG. 19, the original point O(O, O, O) is taken at the middle point of the baseline B; x-axis taken along the baseline B; y-axis (not shown) taken perpendicularly to the plane of drawing paper; z-axis taken perpendicularly to the baseline B; focal length of the lenses of the right- and left-side cameras taken as f; and coordinates of the point P on the object and of the projection points $P_R$, $P_L$ taken respectively as $(x_p, y_p, z_p)$, $(x_{PL}, y_{PL}, z_{PL})$ and $(x_{PL}, y_{PL}, z_{PL})$. If the optical axes of the right- and left-side cameras are perpendicular to the baseline B as shown in FIG. 19 (namely if said two optical axes are mutually parallel), there stand following relationships:

$$(x_{PL}+L_B/2)/f=(x_P+L_B/2)/z_P \quad (1.1)$$

$$(x_{PR}-L_B/2)/f=(x_P-L_B/2)/z_P \quad (1.2)$$

$$y_L/f=y_R/f=y/z_P \quad (1.3)$$

$$(L_B+x_{PL}-x_{PR})/f=L_B/z_P \quad (1.4)$$

Consequently, the coordinate $(x_P, y_P, z_P)$ of the point P on the object can be determined from:

$$x_P=L_B \cdot \{(x_{PL}+x_{PR})/2\}/(L_B+x_{PL}-x_{PR}) \quad (2.1)$$

$$y_P=L_B \cdot \{(y_{PL}+y_{PR})/2\}/(L_B+x_{PL}-x_{PR}) \quad (2.2)$$

$$z_P=L_B \cdot f/(L_B+x_{PL}-x_{PR}) \quad (2.3)$$

On the other hand, if the optical axes of the right- and left-side cameras are inclined to the baseline B by a certain angle θ, there stand the following relationships:

$$(x_{PL}+L_B/2)/z_{PL}=(x_P+L_B/2)/z_P \quad (3.1)$$

$$(x_{PR}-L_B/2)/z_{PR}=(x_P-L_B/2)/z_P \quad (3.2)$$

$$y_{PL}/z_{PL}=y_{PR}/z_{PR}=y_P/z_P \quad (3.3)$$

$$L_B/z_P=\{(x_{PL}+L_B/2-(z_{PL}/z_{PR})(x_{PR}-L_B/2)\}/z_{PL} \quad (3.4)$$

where; $|x_{PR}| \geq |x_{PL}|$ $$L_B/z_P=\{-(x_{PR}-L_B/2)+(z_{PR}/z_{PL})(x_{PL}L_B/2)\}/z_{PR} \quad (3.5)$$

where; $|x_{PR}|<|x_{PL}|$ $$z_{PR}=(x_{PR}-L_B/2)\cdot \tan(\theta)+f\cdot \cos(\theta) \quad (3.6)$$

$$z_{PL}=-(x_{PL}+L_B/2)\cdot \tan(\theta)+f\cdot \cos(\theta) \quad (3.7)$$

Consequently the coordinate $(x_P, y_P, z_P)$ of the point P on the object can be determined from the foregoing relations (3.1) to (3.7).

The above-explained trigonometry allows to determine the distance to the object from two images obtained by a multi-eye image taking system consisting of right- and left-side image taking systems. The principle of trigonometry is based on a premise that the projection point $P_R$ on the sensor plane $A_{SR}$ of the right-side camera and that $P_L$ on the sensor plane $A_{SL}$ of the left-side camera are obtained from a same single point P. It is therefore necessary to extract the projection point $P_R$ on the sensor plane $A_{SR}$ of the right-side camera, corresponding to the projection point $P_L$ on the sensor plane $A_{SL}$ of the left-side camera, and, in a result for obtaining the distance information with the multi-eye image taking system, the method of extracting the corresponding points becomes critical. Representative examples of such method include the template matching method already employed in manufacturing sites, and the cooperative algorithm based on visual processing:

(1) Template matching method:

The template matching method determines the corresponding point by conceiving a template, surrounding an arbitrary point of the left image formed on the sensor plane $A_{SL}$ of the left-side camera, and comparing the similarity of the right image formed on the sensor plane $A_{SR}$ of the right-side camera, with respect to the image in the template. The similarity can be compared with the following two method; (a) SSDA (Sequential similarity detection algorithm):

In this SSDA method, the difference between the pixel value $E_L$ of the image in the template in the left image and the pixel value $E_R$ in the right image to be searched is added up, as shown in the equation (4.1), for all the pixels on the epipolar line $L_{eL}$ of the left image and all the pixels on the epipolar line $L_{eR}$ of the right image, and the coordinate of the corresponding point is obtained where the calculated sum $E(x, y)$ becomes minimum.

$$E(x, y) = \sum_{i,j} |E_R(x-i, y-j) - E_L(x-i, y-j)| \quad (4.1)$$

In this SSDA method, if the sum of the difference of the pixel values in the course of calculation becomes larger than the minimum value obtained in the already-completed calculations for other coordinates, the calculation under way can be terminated and shifted to the next coordinate value, and it is therefore possible to shorten the calculating time, by thus dispensing with the unnecessary calculations.

(b) Correlation method:

The correlation method calculates the correlational value $\rho(x, y)$ between the pixel values $E_L$ of the image in the template in the left image and the pixel values $E_R$ in the right image to be searched, as shown in the following equation (4.2), and determines the coordinate of the corresponding point where the calculated correlation $\rho(x, y)$ becomes largest. The normalized correlation in the equation (4.2) provides a maximum value "1".

$$\rho(x, y) = \frac{\Sigma(E_R(x-i, y-j) \cdot E_L(x-i, y-j))}{\sqrt{\Sigma E_R^2(x-i, y-j)} \cdot \sqrt{\Sigma E_L^2(x-i, y-j)}} \quad (4.2)$$

(2) Cooperation Method (Cooperative algorithm)

The cooperative algorithm, proposed by David Marr, is to obtain a parallax line based on the following three rules (D. Marr, Vision: A Computational Investigation into the Human Representation and Processing of Visual Information, W. H. Freeman & Co., San Francisco, Calif., 1982):

Rule 1 (Matchability): A black point can be matched with only a black point;

Rule 2 (Unity): A black point in an image can almost always be matched only with a black point in the other image; and Rule 3 (Continuity): Parallax of the matching points smoothly varies over an almost entire range.

According to Marr, a device for extracting the corresponding points, exploiting the cooperative algorithm, consists of a network in which a multitude of processing units are connected in parallel and mutual manner, and a small processing unit is placed at each crossing point or nodal point shown in FIG. 21A. If a nodal point represents a proper pair of black points, the processing unit at said nodal point eventually has a value "1", but, if it represents an improper pair (an erroneous (incorrect) target), the processing unit has a value "0".

The rule 2 allows only single correspondence along the horizontal or vertical line. Thus, all the processing units provided along each horizontal or vertical line are made to suppress one another. This is based on a principle that the competition along each line causes only one processing unit to survive as "1" and all other units to have a value "0", thereby satisfying the rule 2.

As the proper pairs tend to be arranged along the broken line according to the rule 3, an excitatory coupling is introduced between the processing units aligned in this direction. This provides each local processing unit with a structure as shown in FIG. 21B. More specifically, as inhibitory coupling is given to the processing units arranged along the vertical line 102 and the horizontal line 101 corresponding to the line of sight (visual axis) of both eyes, and an excitatory coupling is given to the processing units arranged along the diagonal line 103 corresponding to a given parallax. This algorithm can be expanded to the case of a two-dimensional image, and, in such case, the inhibitory couplings remain unchanged while the excitatory coupling is given to a minute two-dimensional region 104 corresponding to a constant parallax, as shown in FIG. 21C.

In such device for extracting the corresponding points, the right and left images are taken at first, then the network of the device is added to a load with "1" at all the points where two black points are matched (including the erroneous targets), and with "0" at all other points, and the network is then made to run. Each processing unit sums up "1" in the excitatory vicinity and "1" in the inhibitory vicinity, and, after applying a suitable weight to either sum, calculates the difference of the sums. The processing unit is set at a value "1" or "0", respectively if the obtained result exceeds a certain threshold value or not. This algorithm can be represented by the following repeating relation equation (5):

$$C_{x,y,d}^{t+1} = \sigma \left\{ \sum_{x',y',d' \in S(x,y,d)} C_{x',y',d'}^t - \epsilon \sum_{x',y',d' \in O(x,y,d)} C_{x',y',d'}^t + C_{x,y,d}^o \right\} \quad (5)$$

where $C_{x,y,d}^t$ represents the state of a cell, corresponding to a position (x,y), a parallax d and a Time t, in the network shown in FIG. 21A; S (x,y,d) represents a local excitatory vicinity; O(x,y,d) represents an inhibitory vicinity; $\epsilon$ is an inhibitory constant; and c is a threshold function. The initial state $C^o$ contains all the possible pairs, including the erroneous targets, within a predetermined parallax range, and such pairs are added in each repeating cycle. (Such operation is not essential but causes faster converging of the algorithm.)

In the following there will be given a detailed explanation on the method of extracting corresponding points in plural images, by forming a parallax image plane from two epipolar lines respectively extracted from two binary images, and determining a parallax line by repeating local processing involving excitatory and inhibitory couplings on said parallax image, based on the real pixels of said two binary images, thereby extracting the corresponding points thereof.

At first there will be given an explanation on the parallax line, with reference to FIGS. 22 and 23. When the optical axes of the right- and left-side cameras are perpendicular to the baseline, there is obtained a set of epipolar lines $L_{eL}$, $L_{eR}$ by the projection of the object, as shown in FIG. 22. Then, as shown in FIG. 23, thus obtained left epipolar line $L_{eL}$ is placed horizontally, with its pixel $a_{1L}$ at the left and pixel $a_{SL}$ at the right, while the right epipolar line $L_{eR}$ is placed vertically, with its pixel $a_{1R}$ at the bottom and pixel $a_{SR}$ at the top, and the crossing points $b_1$ to $b_5$ of the mutually corresponding pixels (for example pixels $a_{1L}$ and $a_{1R}$) of the epipolar lines $L_{eL}$, $L_{eR}$. A line connecting said crossing points $b_1$ to $b_5$ is called "parallax line 114", which becomes, in case of a constant parallax, a straight line with an inclination of 45°. Thus, the variation in the parallax between the left- and right-side images can be clarified by the parallax line 114. Also a plane defined by the two epipolar lines $L_{eL}$, $L_{eR}$ is called a "parallax image plane" 113.

In the following there will be explained the relation between the parallax line and the distance, with reference to FIGS. 24A to 28B. For points $a_{21}$ to $a_{25}$, shown in FIG. 24A, of a constant parallax, positioned distant from the right- and left-side cameras, a parallax image plane 121 and a parallax line 131 can be similarly determined as shown in FIG. 24B. Also points $a_{31}$ to $a_{34}$, shown in FIG. 25A, of a constant parallax, positioned closer to the cameras than the above-mentioned points $a_{21}$ to $a_{25}$, provide similarly a parallax image plane 122 and a parallax line 132 as shown in FIG. 25B. Furthermore, points $a_{41}$ to $a_{43}$ of a constant parallax, positioned still closer to the cameras than the above-mentioned points $a_{31}$ to $a_{34}$ as shown in FIG. 26A similarly provide a parallax image plane 123 and a parallax line 133 as shown in FIG. 26B. Furthermore, points $a_{51}$, $a_{52}$ of a constant parallax, positioned still closer to the cameras than the above-mentioned points $a_{41}$ to $a_{43}$ as shown in FIG. 27A similarly provide a parallax image plane 124 and a parallax line 134 as shown in FIG. 27B.

The foregoing indicate, if the optical axes of the right- and left-side cameras are perpendicular to the baseline, that:

(1) When the points of a constant parallax are located at the infinite distance from the cameras, the obtained parallax line becomes a straight line with an inclination of 45°, equalling bisecting the parallax image plane;

(2) As the points of a constant parallax come closer to the cameras, the obtained parallax line becomes a straight line with an inclination of 45°, positioned closer to the lower right corner of the parallax image plane.

Furthermore, points $a_{61}$ to $a_{66}$ as shown in FIG. 28A provide, in a similar manner, a parallax image plane 125 and a parallax line 135 as shown in FIG. 28B. The obtained parallax line 135 proceeds, from the lower left corner of the parallax image plane 125, toward the upper right corner along the parallax line 131 shown in FIG. 24B, then shifts to the parallax line 132 shown in FIG. 25B, and again proceeds toward the upper right corner along the parallax line 131 in FIG. 24B. Consequently, for an object with irregular surface, there can be obtained a parallax line corresponding to the surface irregularity.

The foregoing results indicate that the distance to the object can be determined from the coordinates of the parallax line, if the frigonometrically determined distance data are retained in the coordinates of the parallax image plane.

In the following there will be explained, with reference to a flow chart shown in FIG. 29, an example of corresponding point extraction by the cooperative algorithm from extremely similar two binary images, for example Julesz's random dot stereogram (cf. David Marr, translated by Inui et al., Vision (Computation Theory of Vision and In-brain Representation), Sangyo Tosho).

After two binary images involving parallax, such as a random dot stereogram, are entered by a multi-eye image taking system (step S1), an arbitrary set of epipolar lines $L_{eL}$, $L_{eR}$ are extracted from said two binary images (step S2). Then the extracted epipolar lines $L_{eL}$, $L_{eR}$ are arranged as shown in FIG. 30 (step S3). More specifically, the left epipolar line $L_{eL}$ is placed horizontally, with its left-hand end $141_L$ at the left and its right-hand end $141_R$ at the right, while the right epipolar line $L_{eR}$ is placed vertically, with its left-hand end $142_L$ at the bottom and its right-hand end $142_R$ at the top. Subsequently black points are generated on all the crossing points, on the parallax image plane 143, of "black" pixels on the left epipolar line $L_{eL}$ and those on the right epipolar line $L_{eR}$, whereby an initial image frame 144, representing the initial value of the parallax image plane 143, is prepared as shown in FIG. 31 (step S4). Then, each black point in thus prepared initial image frame 144 is subjected to a local processing, involving excitatory and inhibitory couplings, based on the real pixels (step S5). In this operation, the excitatory coupling based on the real pixel is applied to the crossing points, present in an ellipse 150 as shown in FIG. 32, having its center at an arbitrary black point Q in the initial image frame 144, a longer axis 151 along a line of 45° toward upper right, and a shorter axis 152 along a line of −45° toward lower right. Also the inhibitory coupling based on the real pixel is applied to the crossing points, present along the horizontal or vertical direction with respect to the black point Q. Then, each crossing point in the initial image frame 144, subjected to the local processing involving the excitatory and inhibitory coupling based on the real pixel, is subjected to a predetermined processing, for example utilizing a binary threshold function as shown in FIG. 33 (corresponding to the threshold function G in the foregoing equation (5)), whereby a new parallax image frame is prepared (step S6). Then there is discriminated whether the processes of the steps S5 and S6 have been executed for a predetermined number of times (step S7), and, if not, the processes of the steps S5 and S6 are repeated, employing the new parallax image frame, prepared in the foregoing step S6, as the initial image frame. As a result, a parallax line is finally obtained on the parallax image frame prepared in the step S6, and the corresponding points can be extracted, utilizing said parallax line.

Instead of the discrimination in the step S7, the processes of the steps S5 and S6 may be repeated, utilizing the new parallax image frame prepared in the preceding step S6 as the initial image frame, until the value of each crossing point therein converges. Also on the two binary images taken in the step S1, the parallax line can be obtained on another set of epipolar lines $L_{eL}$, $L_{eR}$ by repeating the processes of the step S2 to S7.

Now, there will be given a detailed explanation, with reference to FIG. 34, on the method of extraction of a set of epipolar lines in the step S2 in FIG. 29.

Referring to FIG. 34, the lenses of the two (left-side and right-side) cameras have respective centers at $O_L$, $O_R$; and the coordinate on the sensor plane $A_{SL}$ of the left-side camera is represented by $(x_L, y_L, z_L)$; while that on the sensor plane $A_{SR}$ of the right-side camera is represented by $(x_R, y_R, z_R)$. The axes $z_L$, $z_R$ are so selected as to coincide with the respective optical axes.

By representing the unit vectors of the axes $x_L$, $y_L$, $z_L$, $x_R$, $Y_R$ and $z_R$ respectively by:

$$i_L, j_L, k_L, i_R, j_R, k_R$$

also the distance from the sensor plane $A_{SL}$ of the left-side camera to the center $O_L$ of the lens thereof by $f_L$; and the distance from the sensor plane $A_{SR}$ of the right-side camera to the center $O_R$ of the lens thereof by $f_R$; the vector:

$$P_L$$

of the projection point $P_L$ of a point P of the object onto the sensor plane $A_{SL}$ of the left-side camera, and the vector:

$$P_R$$

of the corresponding projection point $P_R$ on the sensor plane $A_{SR}$ of the right-side camera can be respectively represented by:

$$P_L = O_L + X_L i_L + Y_L j_L + f_L k_L \qquad (6.1)$$

$$P_R = O_R + X_R i_R + Y_R j_R + f_R k_R \qquad (6.2)$$

Also the relative position vector:

$$V_L$$

between the projection point $P_L$ on the sensor plane $A_{SL}$ of the left-side camera and the relative position vector:

$$V_R$$

between the projection point $P_R$ on the sensor plane $A_{SR}$ of the right-side camera can be respectively represented by:

$$V_L = P_L - O_L \qquad (6.3)$$

$$V_R = P_R - O_R \qquad (6.4)$$

and the relative position vector:

$$d$$

between the centers $O_L$, $O_R$ of the lenses of the left- and right-side cameras (corresponding to the baseline length) can be represented as:

$$d = O_L - O_R \qquad (6.5)$$

Furthermore the unit normal vector:

$$n_{Le}$$

to the epipolar plane $A_e$ can be represented as:

$$n_{Le} = -\frac{V_L \times d}{|V_L \times d|} \qquad (6.6)$$

By representing the unit normal vector to the sensor plane $A_{SR}$ of the right-side camera by:

$$k_R$$

The right epipolar line $L_{eR}$ is perpendicular to $n_{Le}$ and $k_R$, so that the unit vector:

$$e_{Re}$$

in this direction can be represented as:

$$e_{Re} = \frac{n_{Le} \times k_R}{|n_{Le} \times k_R|} \qquad (6.7)$$

consequently, with the vector:

$$P_R$$

of the projection point $P_R$ on the sensor plane $A_{SR}$ of the right-side camera, the right epipolar line $L_{eR}$ can be represented as:

$$P_R + \beta e_{Re} \qquad (6.9)$$

A similar representation stands also for the left epipolar line $L_{eL}$.

SUMMARY OF THE INVENTION

However, the above-explained conventional methods for extracting the corresponding points from plural images have been associated with the following drawbacks.

(1) The template matching method is unable to provide sufficient precision, because the correspondence to a point in an image is limited to the pixel points in the other image, and may lead to an erroneous correspondence in case of images with a periodical structure;

(2) The template matching method is unable to provide sufficient reliability in case of binary images with a periodical structure, because of possible erroneous correspondence; and (3) The cooperative algorithm requires a long time for obtaining the parallax line from the initial image frame by the excitatory and inhibitory processes, and is not necessarily satisfactory in terms of the reliability.

The object of the present invention, therefore, is to provide a method for extracting corresponding points from plural images, capable of improving the reliability and shortening the process time.

A first method of the present invention, for extracting the corresponding points from plural images is featured, in extracting corresponding points, based on plural points on an epipolar line extracted in arbitrary one of the plural images, from another of said plural images, by determining a Group of candidate points and transferring said group of candidate points onto a certain straight line.

At the transfer of said group of candidate points onto said straight line, there may be transferred only those whose distance to said straight line is smaller than a predetermined threshold value, and the candidate points whose distance to said straight line exceeds the predetermined threshold value may be eliminated from the transfer.

Also at the determination of said group of candidate corresponding points, there may be employed a method of extracting the corresponding points from plural images, consisting of effecting local processes involving excitatory and inhibitory coupling based on real pixels, at each of the crossing points on the parallax image plane formed by plural epipolar lines respectively extracted from said plural images, thereby determining the parallax line and extracting, based thereon, the corresponding points of said plural images.

A second method of the present invention, for extracting the corresponding points from plural image is featured, in effecting local processes involving excitatory and inhibitory couplings based on the real pixels at each of the crossing points on the parallax image plane formed from plural epipolar lines respectively extracted from said plural images thereby determining the parallax line and extracting the correspoints of said plural images based on said parallax line, by determining a group of candidate points by a method other than the cooperative method and preparing an initial image frame by said cooperative method, utilizing said group of thus determined candidate points.

The template matching method may be used for said group of candidate points.

The above-mentioned first method of the present invention allows to determined the correspondence with a sub-pixel precision, because the corresponding relationship among plural images can be determined more precisely than in the conventional methods. Also at the transfer of the group of candidate points onto the aforementioned straight line, there may be transferred only those whose distance to said straight line is smaller than a predetermined threshold value and the candidate points whose distance to the straight line exceeds the predetermined threshold value may be eliminated from the transfer. In this manner said threshold value can be used as the reference for identifying an erroneous correspondence, and, by eliminating the candidate points whose distance exceeds said threshold value, the corresponding relationship among plural image can be determined in a clearer manner.

The above-mentioned second method of the present invention can accelerate the generation of the parallax line in the parallax image plane, by pre-determining a group of candidate points by a method other than the cooperative method (For example the template matching method) and then preparing an initial image frame by the cooperative method, utilizing the group of thus pre-determined candidate points. Also the erroneous correspondence can be reduced by pre-determining the group of candidate points by the template matching method and then preparing the initial image frame, by the cooperative method, from the group of thus predetermined candidate points.

DESCRIPTION OF THE PREFERRED EMBODIMENTS

Now the present invention will be explained by the preferred embodiments shown in the attached drawings.

In the following description, extraction of corresponding points will be conducted with a pair of images taken with a pair of cameras provided at left and right. The extraction of the corresponding points may be made, utilizing either image as the reference, but, in the following the left image is used as the reference for the extraction, and points corresponding to those in said left image will be searched in the right image.

Figure 1:
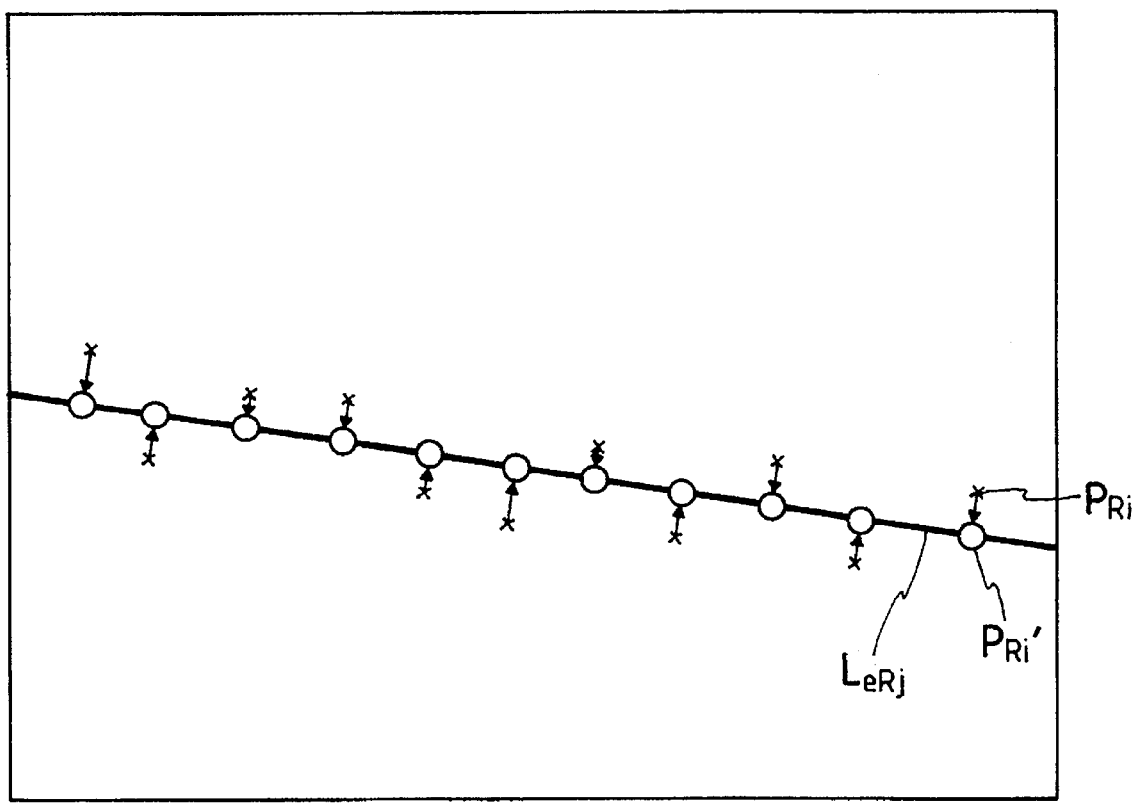
FIG. 1 is a view showing the basic concept of a first method of the present invention, for extracting the corresponding points from plural images.

FIG. 1 is a view showing the basic concept of a first method of the present invention, for extracting corresponding points from plural images.

Figure 2:
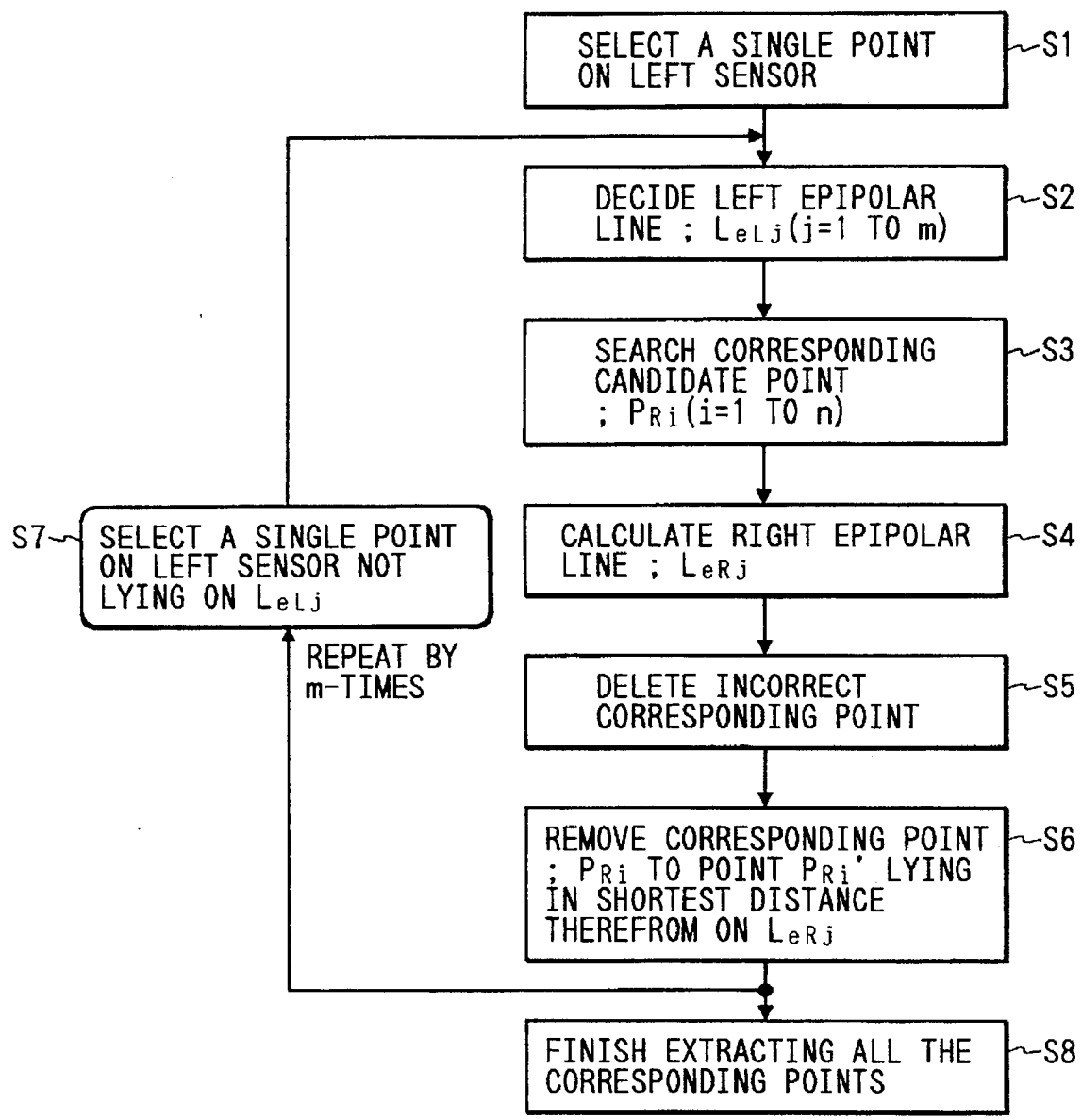
FIG. 2 is a flow chart showing a first embodiment of said first method of the present invention.

A point in the right image, corresponding to a point on the left epipolar line $L_{eLj}$, should in principle coincide with a point $P_{Ri}'$ on the right epipolar line $L_{eRj}$, paired with the left epipolar line $L_{eLj}$. In the conventional methods for extracting the corresponding points, such as the template matching method, however, the corresponding point $P_{Ri}$ involves fluctuation and is often not positioned, as indicated by a mark X, on the right epipolar line $L_{eRj}$. (Such point $P_{Ri}$ will hereinafter be called the candidate corresponding point.) In the first method of the present invention for extracting the corresponding points from plural images, the right epipolar line $L_{eRj}$, on which the corresponding point should be positioned, is determined by calculation, and a candidate corresponding point $R_{Ri}$, obtained on the right image by a conventional extracting method, is shifted to a point $P_{Ri}'$ of shortest distance (indicated by 0 in FIG. 1) on the determined right epipolar line $L_{eRj}$, and the corresponding points in the plural images can be determined in this manner. FIG. 2 is a flow chart for explaining a first embodiment of the first method of the present invention, for extracting corresponding points in plural images. When a point (pixel) is selected on the left-side 10 sensor, an epipolar plane is formed by three points, namely the selected point, the center $O_L$ of the lens of the left-side camera and that $O_R$ of the lens of the right-side camera (step S1). Then, a pair of epipolar lines are obtained, as the crossing lines of thus formed epipolar plane with the left and right sensors (step S2). Such epipolar lines, present in m sets in the image, are represented by $L_{eLj}$, $L_{eRj}$ (j=1 to m). The determined left epipolar line can be represented, as in the foregoing equation (6.9), by:

$$L_{eLj}=P_L+\beta e_{L_a} \tag{7.1}$$

Figure 3:
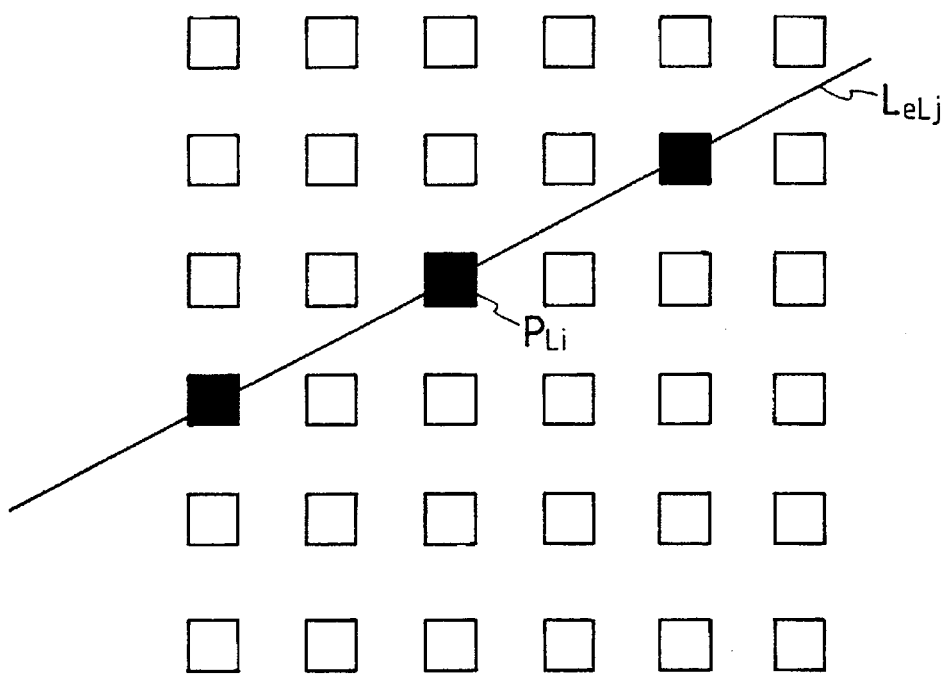
FIGS. 3 to 6 are views showing the operation in a step S3 shown in FIG. 2.
Figure 4:
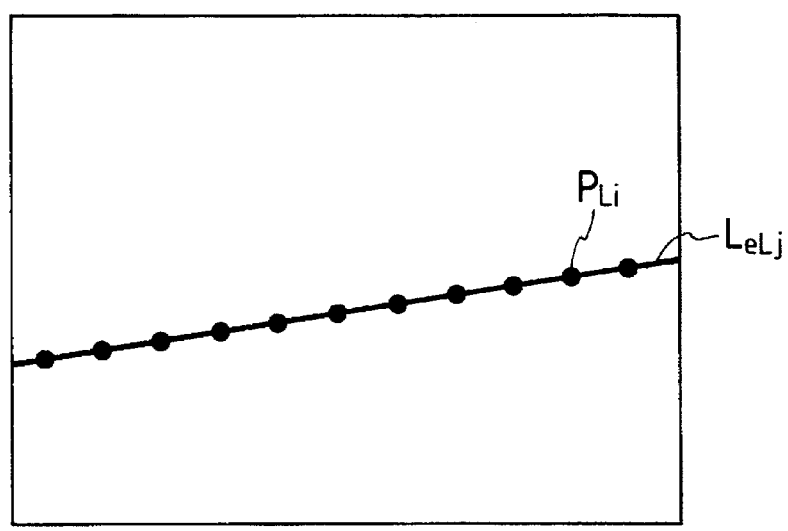
Figure 5:
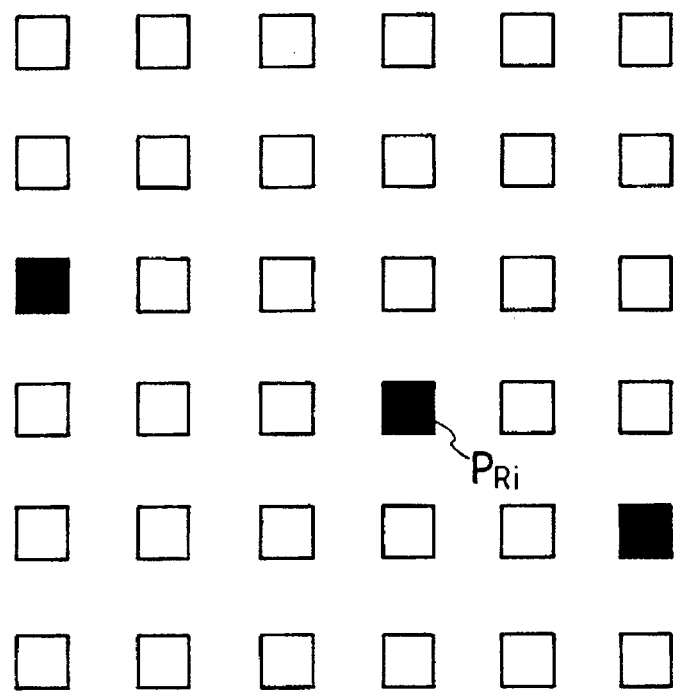
Figure 6:
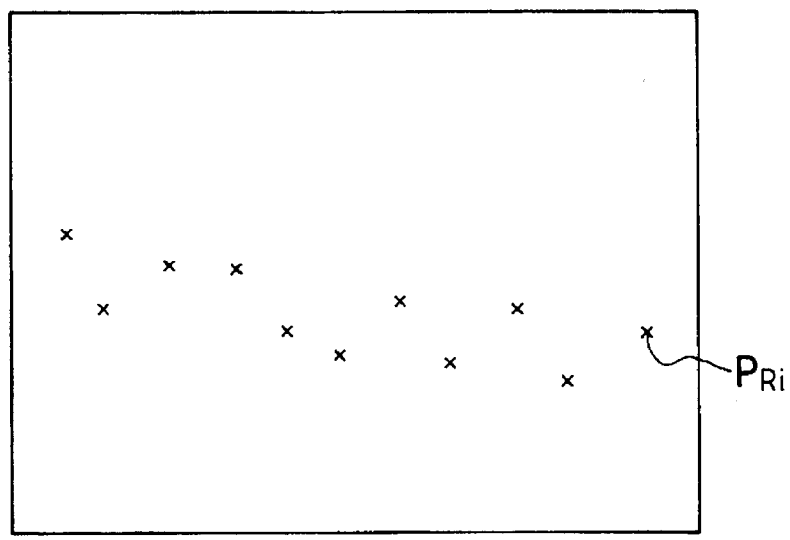

Then, as shown in FIGS. 3 and 4, crossing points $P_{Lj}$ of the left epipolar line $L_{eLj}$ determined in the step S2 and the pixels (white squares in FIG. 3) on the left sensor are extracted. It is assumed that n crossing points $P_{Li}$ are obtained in total over the entire area of the left sensor, and candidate corresponding points $P_{Ri}$ (i=1 to n) are determined for example by the template matching method, for said n crossing points $P_{Li}$ (i=1 to n)(step S3). The candidate corresponding points $P_{Ri}$, given by the template matching method or the like, are usually positioned on the pixels (white squares in FIG. 4) of the right sensor, as shown in FIG. 5. For this reason, the candidate corresponding points $P_{Rj}$, which should be linearly positioned on the right epipolar line $L_{eRj}$ paired with the left epipolar line $L_{eLj}$, are in practice obtained in a fluctuating state as shown in FIG. 6.

Figure 19:
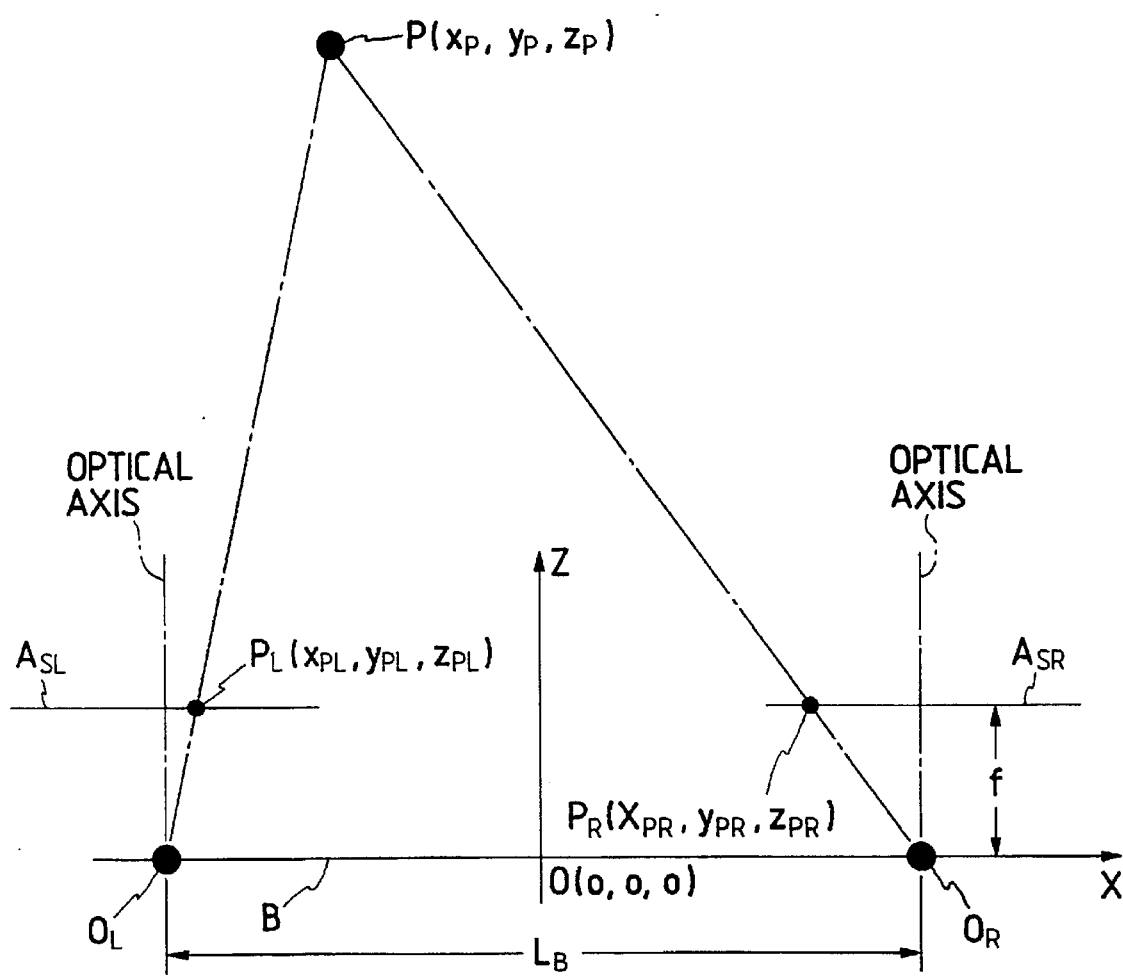
FIG. 19 is a view showing the coordinate of a point on the object in case, in the trigonometry shown in FIG. 18, the optical axes of the left- and right-side cameras are perpendicular to the baseline.
Figure 20:
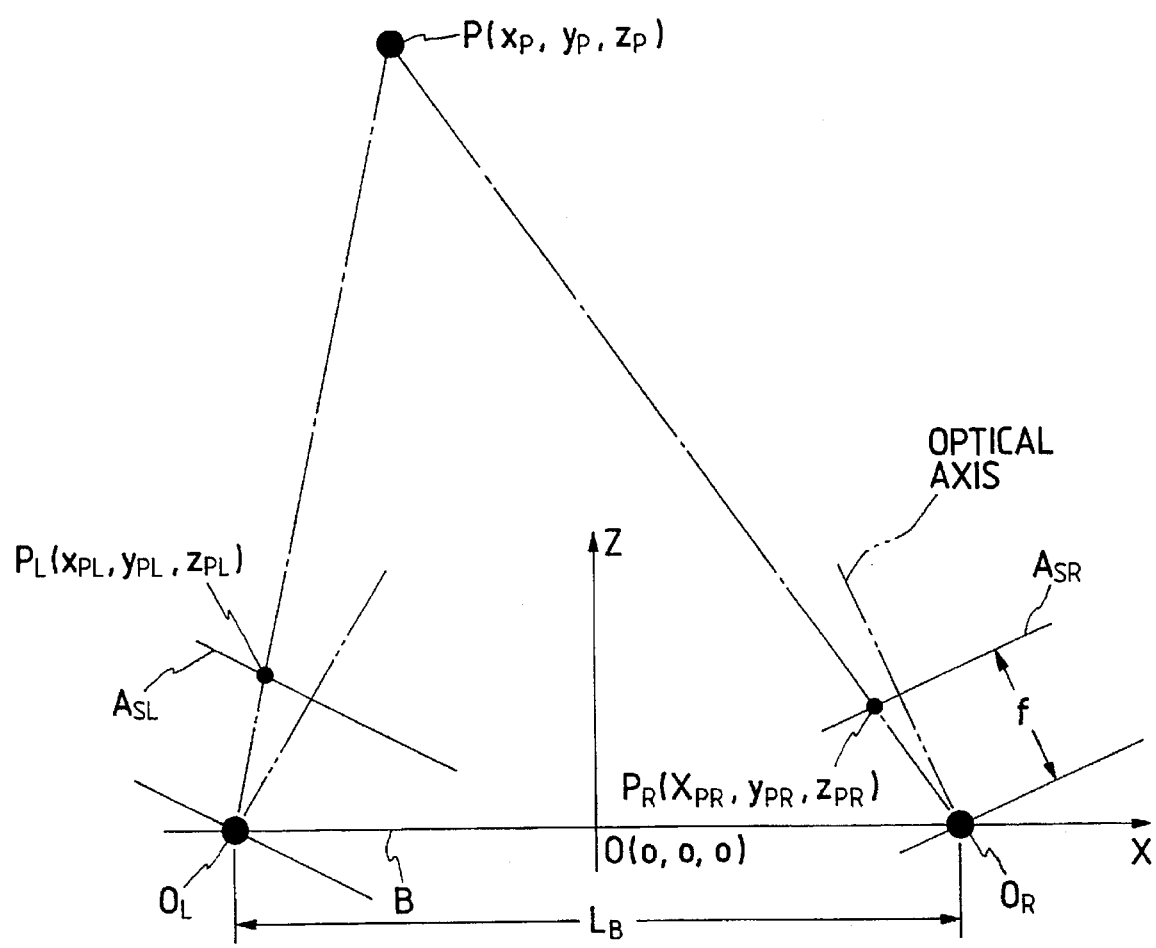
FIG. 20 is a view showing the coordinate of a point on the object in case, in the trigonometry shown in FIG. 18, the optical axes of the left- and right-side cameras are inclined to the baseline.
Figure 21A:
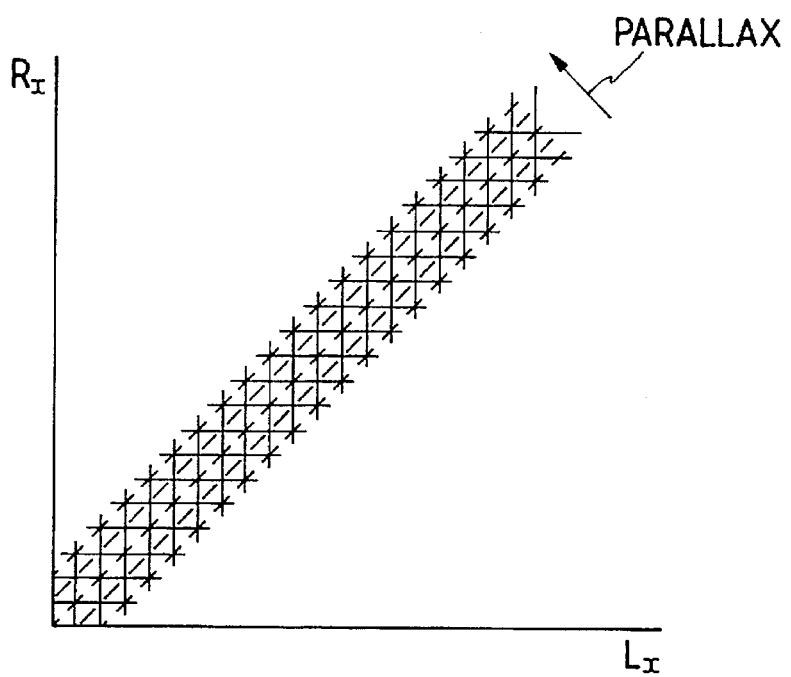
FIGS. 21A, 21B and 21C are views for explaining a cooperative algorithm.
Figure 21B:
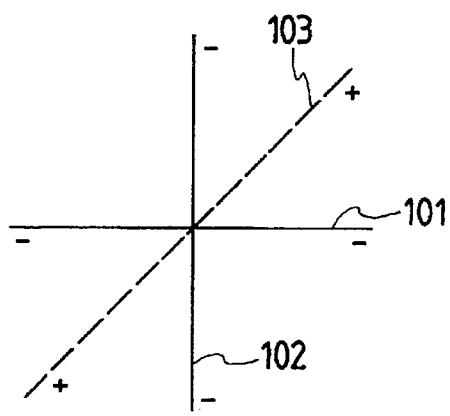
Figure 21C:
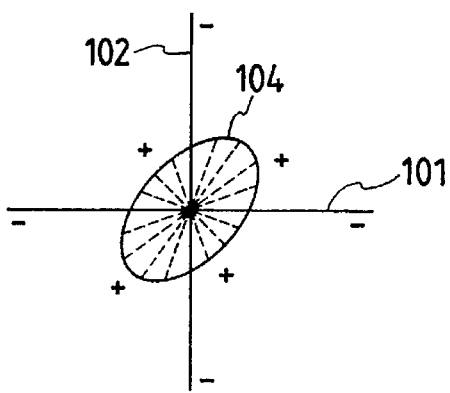
Figure 22:
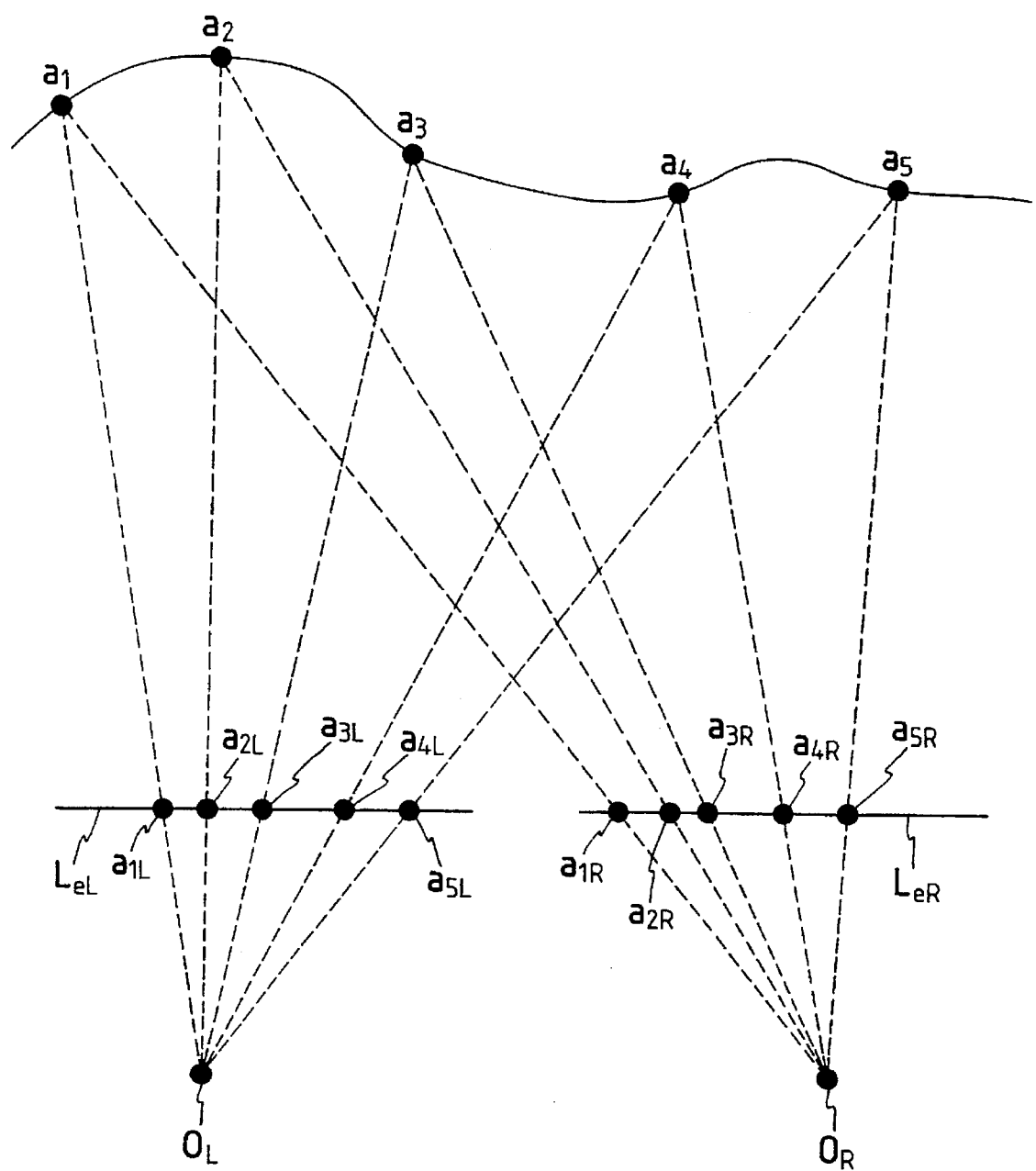
FIGS. 22 and 23 are views for explaining the parallax line.
Figure 23:
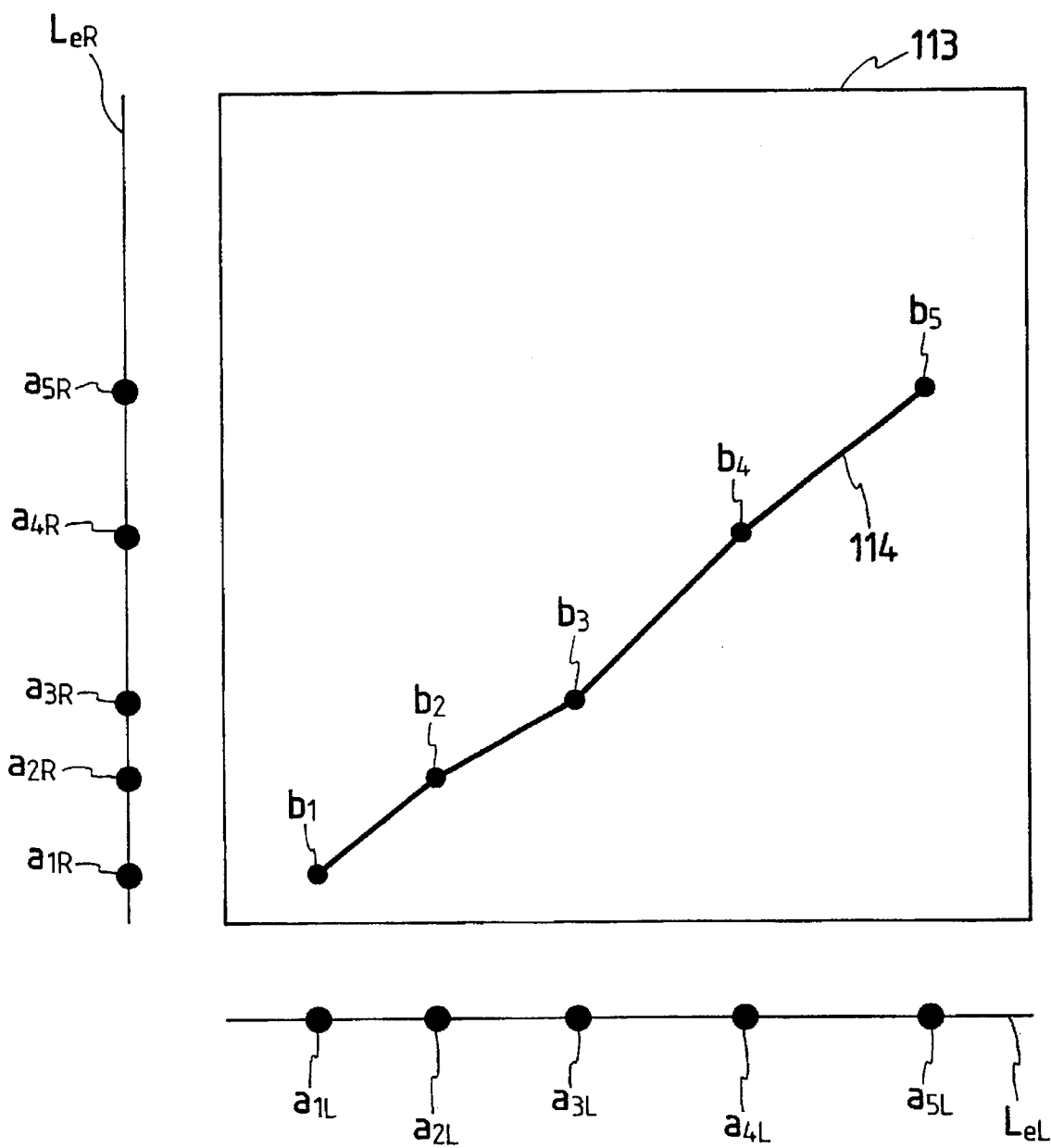
Figure 24A:
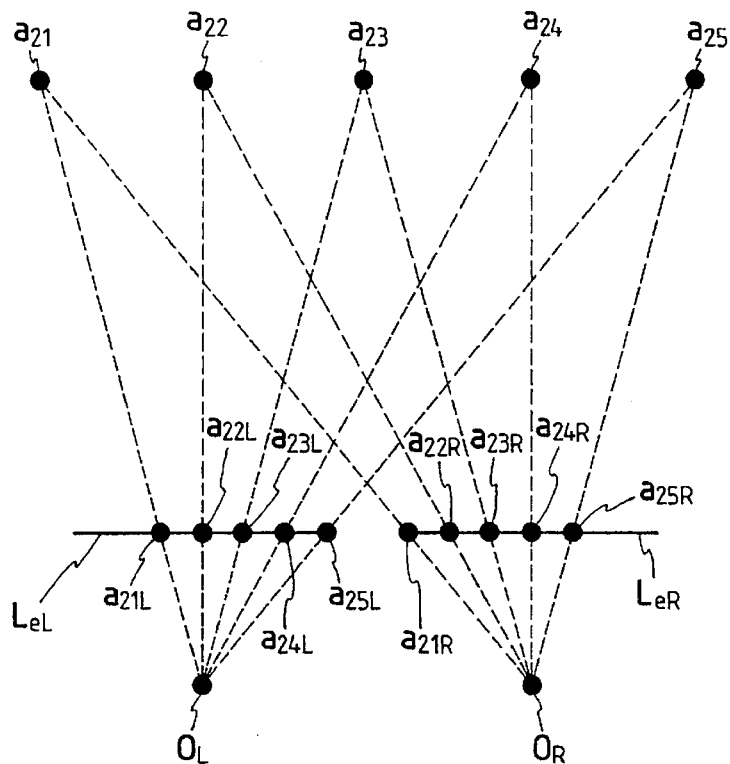
FIGS. 24A to 28B are views for explaining the relationship between the parallax line and the distance.
Figure 24B:
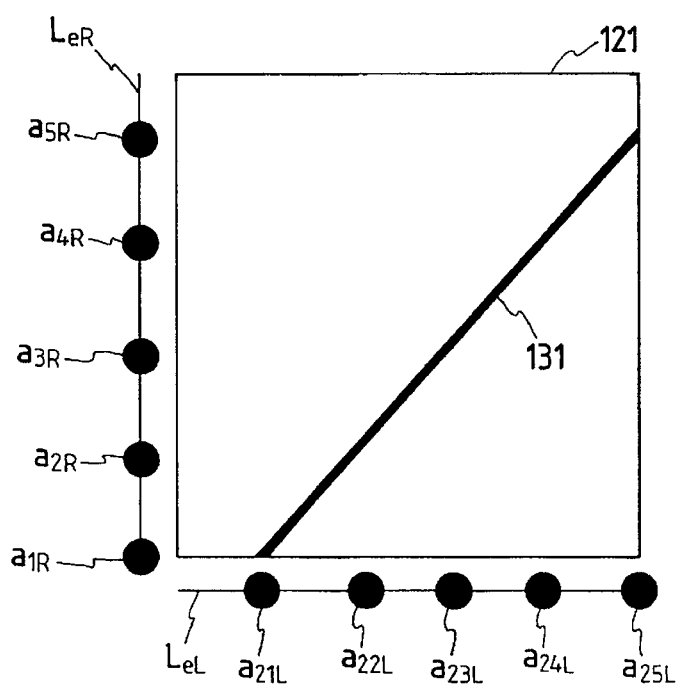
Figure 25A:
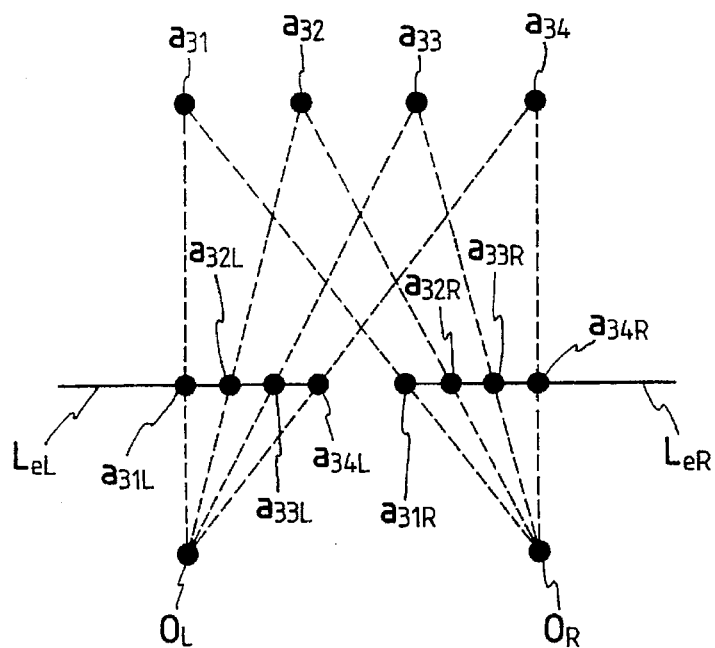
Figure 25B:
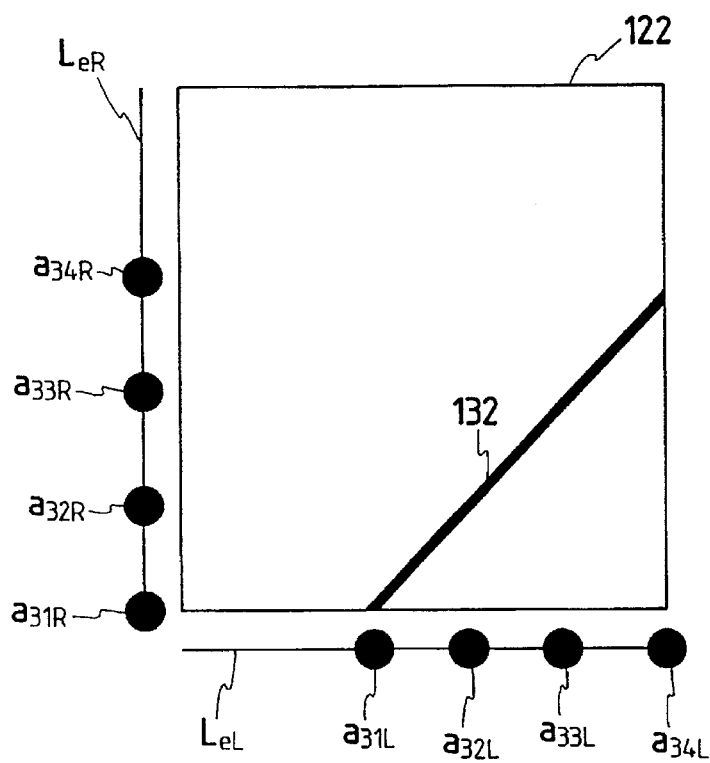
Figure 26A:
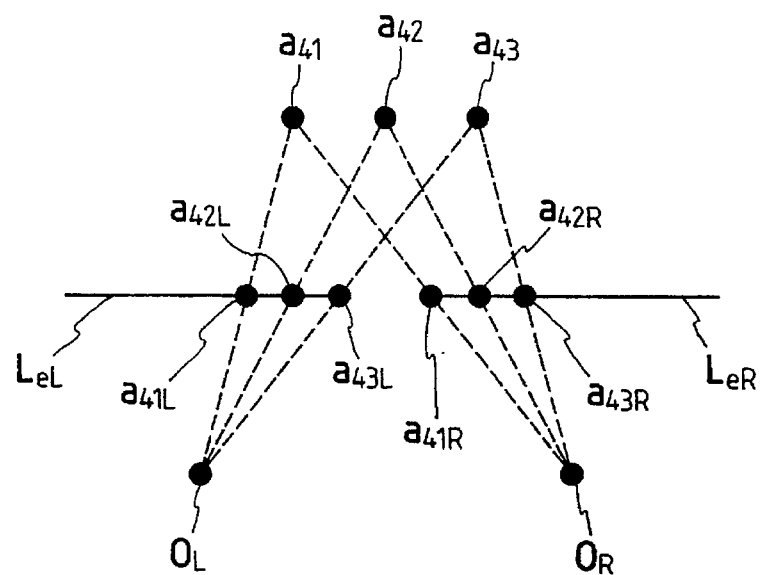
Figure 26B:
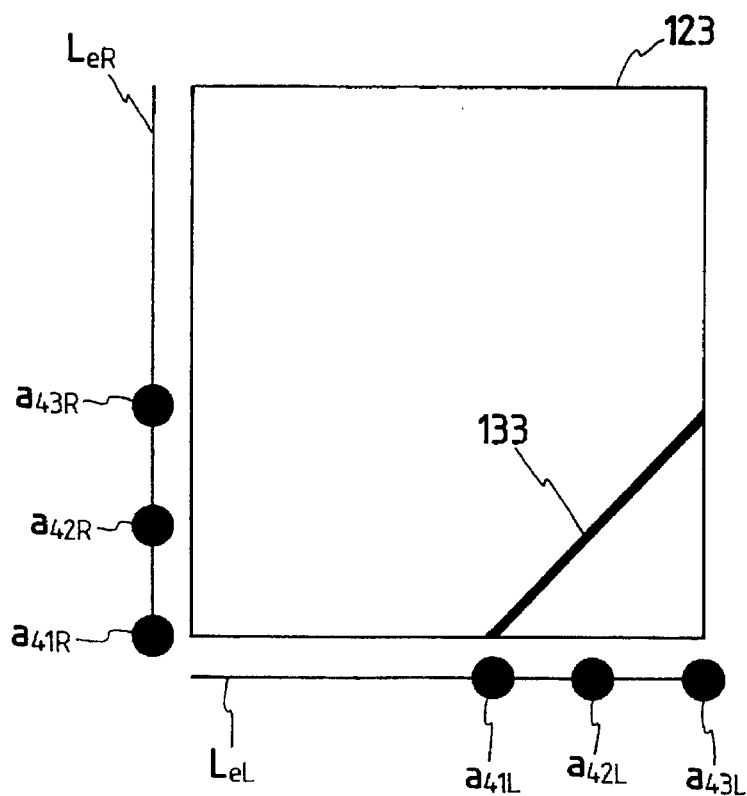
Figure 27A:
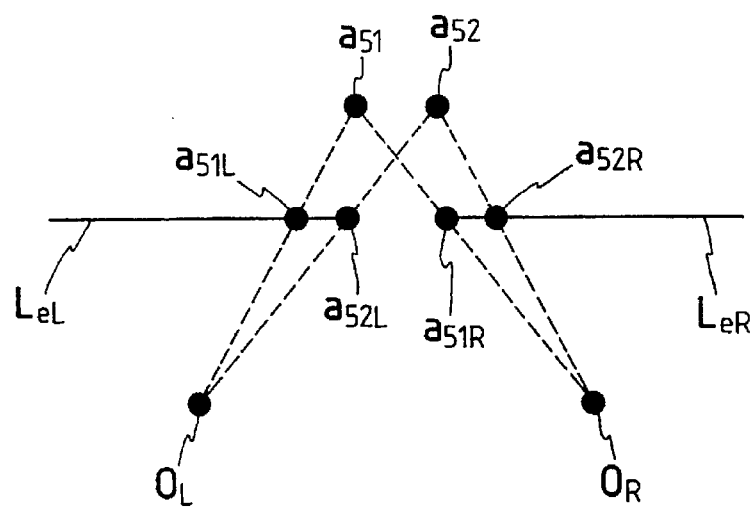
Figure 27B:
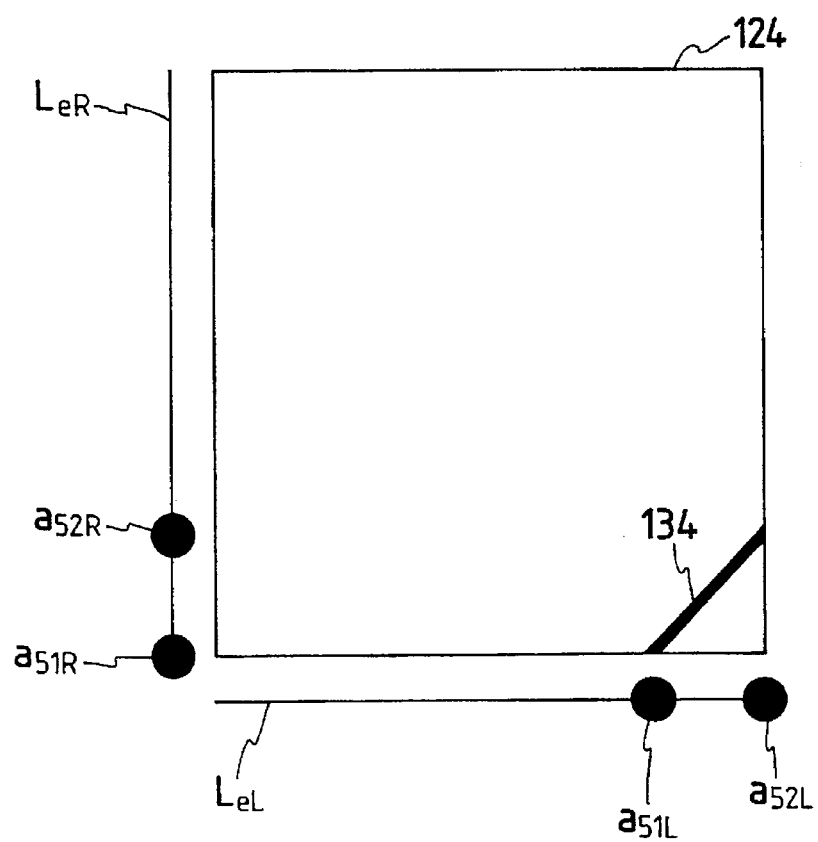
Figure 28A:
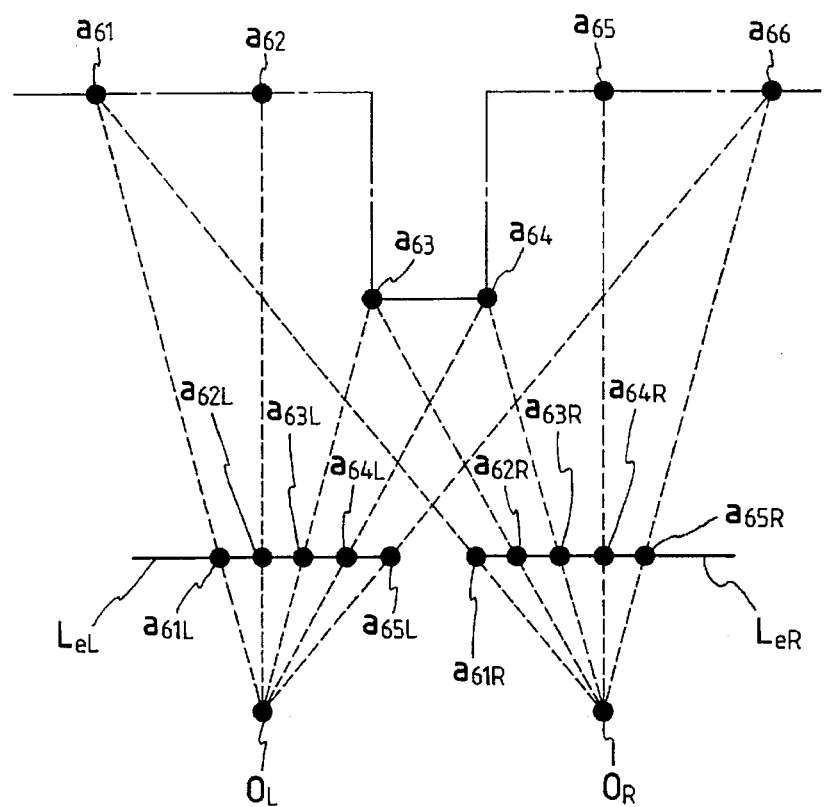
Figure 28B:
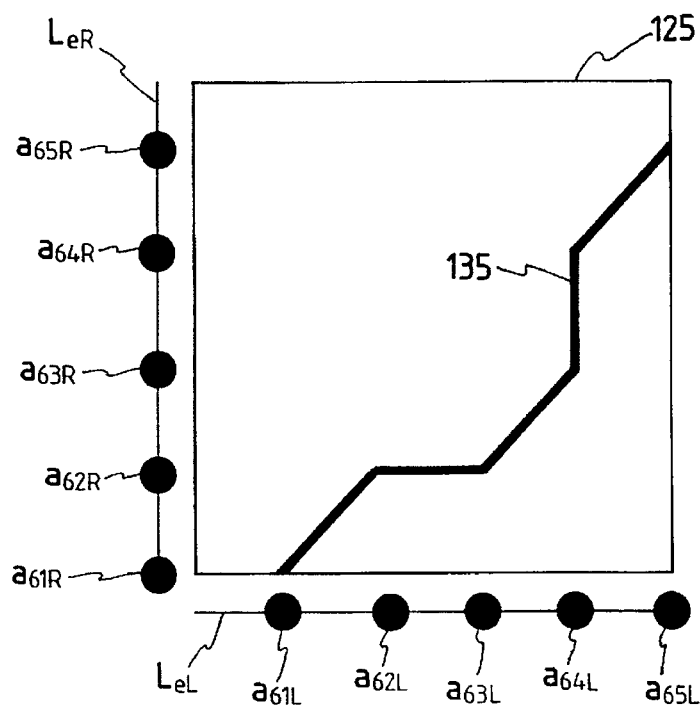
Figure 29:
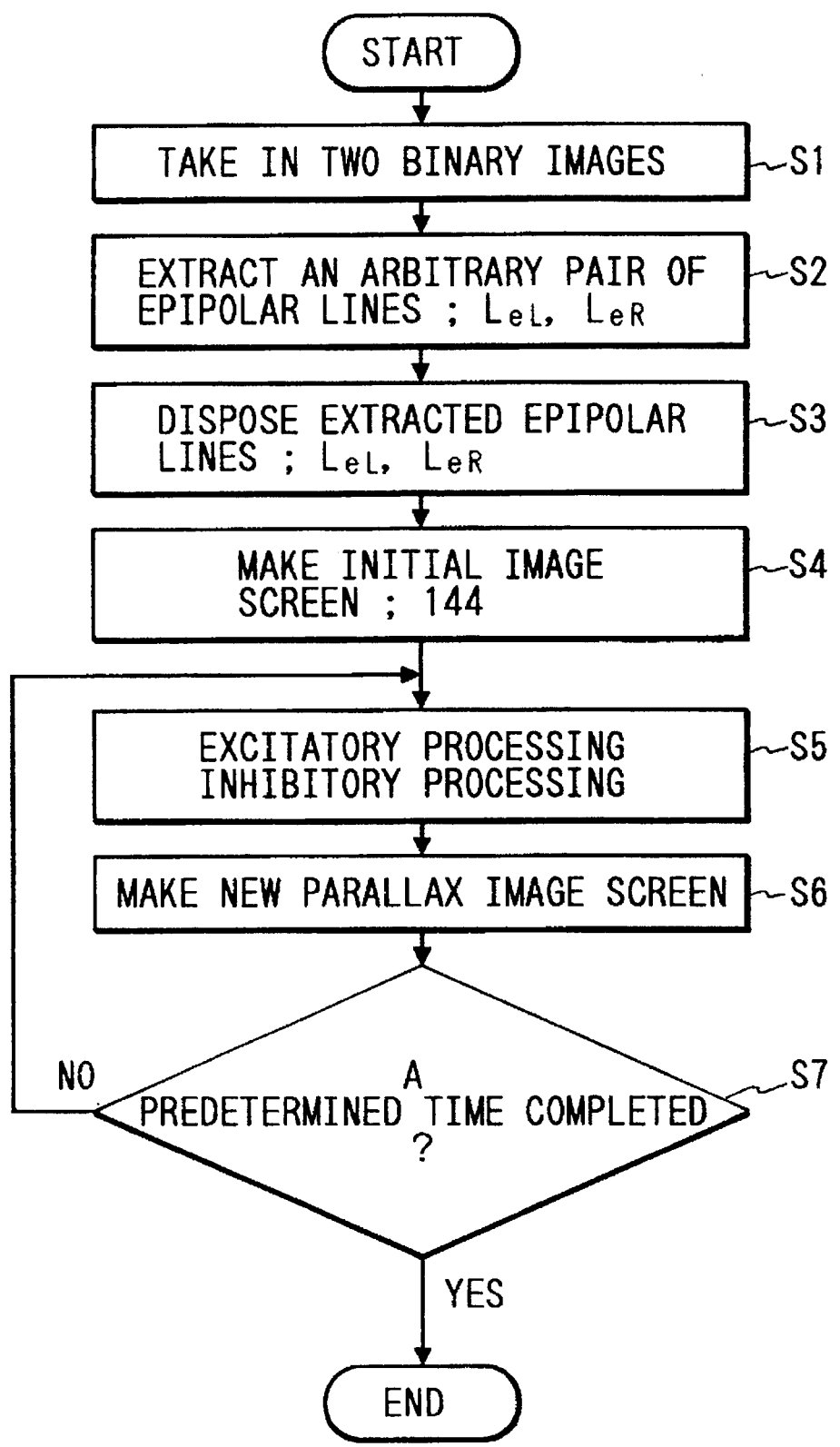
FIG. 29 is a flow chart of an example of corresponding point extraction by the cooperative algorithm from two binary images transformed into extremely similar forms, such as Julesz's random dot stereogram.
Figure 30:
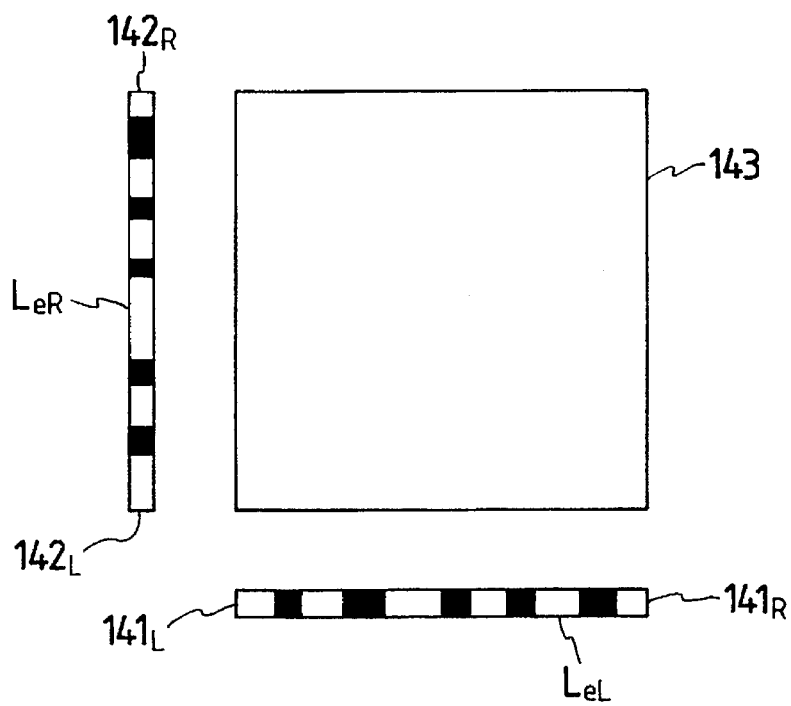
FIG. 30 is a view showing the arrangement of the left and right epipolar lines in the cooperative algorithm.
Figure 31:
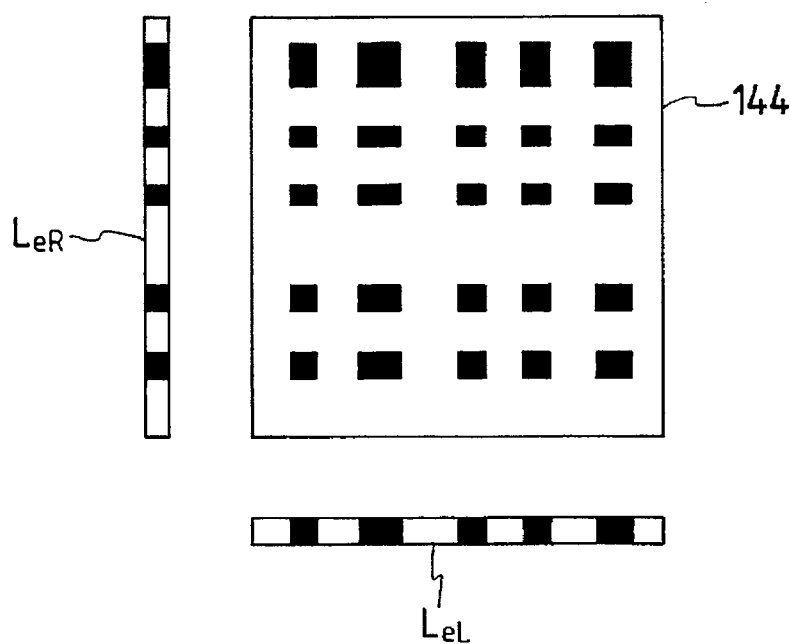
FIG. 31 is a view showing the method of preparation of an initial image frame in the cooperative algorithm.

Thus, the right epipolar line $L_{eRj}$, paired with the left epipolar line $L_{eLj}$, is calculated (step S4). For this purpose there is conceived a coordinate system having the original point at a point O as shown in FIGS. 19 and 20. In this coordinate system, the relative position vector $V_L$ between the projection point $P_L$ on the sensor plane $A_{SL}$ of the left-side camera and the center $O_L$ of the lens thereof is represented as:

$$V_L = (x_{vL}, y_{vL}, z_{vL}) \quad (7.2)$$

Also there is conceived a vector:

$$V_L' = (-x_{vL}, y_{vL}, z_{vL}) \quad (7.3)$$

A point $P_L'$ defined by $$P_L' = O_R + \gamma V_L' \quad (7.4)$$

is positioned on an epipolar plane defined by the points $O_L$, $O_R$ and $P_L$, and becomes also positioned on the right sensor plane or a plane containing said right sensor plane when a condition:

$$\gamma = f_R/f_L \quad (7.5)$$

is satisfied. Consequently a point $X_R$ defined by:

$$X_R = O_R + \frac{f_R}{f_L} V_L' \quad (7.6)$$

is positioned on the right sensor plane and also on the right epipolar line $L_{eRj}$. On the other hand, as the right epipolar line $L_{eRj}$ is perpendicular to:

$n_{Le}$ and $k_R$, the unit vector $e_{Re}$ in this direction can be represented by:

$$e_{Re} = \frac{n_{Le} \times k_R}{|n_{Le} \times k_R|} \quad (7.7)$$

Consequently the right epipolar line $L_{eRj}$ is given by:

$$L_{eRj} = X_R + \alpha e_{Re} \quad (7.8)$$

The candidate corresponding points should be present in the vicinity of the right epipolar line $L_{eRj}$, determined in the step S4. However, for example in case of the template matching method, the candidate corresponding point $P_{Ri}$ may be found in a position distant from the right epipolar line $L_{eRj}$, because of erroneous correspondence. Thus, among the candidate corresponding points $P_{Ri}$, those considered to represent the erroneous correspondences (such point being hereinafter called an erroneous corresponding point) are eliminated (step S5), in order to improve the reliability of the extraction of corresponding points. Such erroneous corresponding points are considered to be more distant, in comparison with other candidate corresponding points $P_{Ri}$, from the right epipolar line $L_{eRj}$. Therefore, if the distance $l_j$ between a candidate corresponding point $P_{Ri}$ and the right epipolar line $L_{eRj}$ is larger than a predetermined threshold value Th, such candidate corresponding point $P_{Ri}$ is considered as an erroneous corresponding point and is eliminated. The above-mentioned threshold value Th can be selected arbitrarily, but it may be selected, for example, as several times of the following average of the distances $l_j$:

$$\sum_{i=1}^{n} l_i/n$$

Also the elimination of the erroneous corresponding points may be achieved by other methods, for example a method of calculating the deviations in the distribution of the candidate corresponding points and eliminating the points whose deviations do not fall within a predetermined range.

Figure 7:
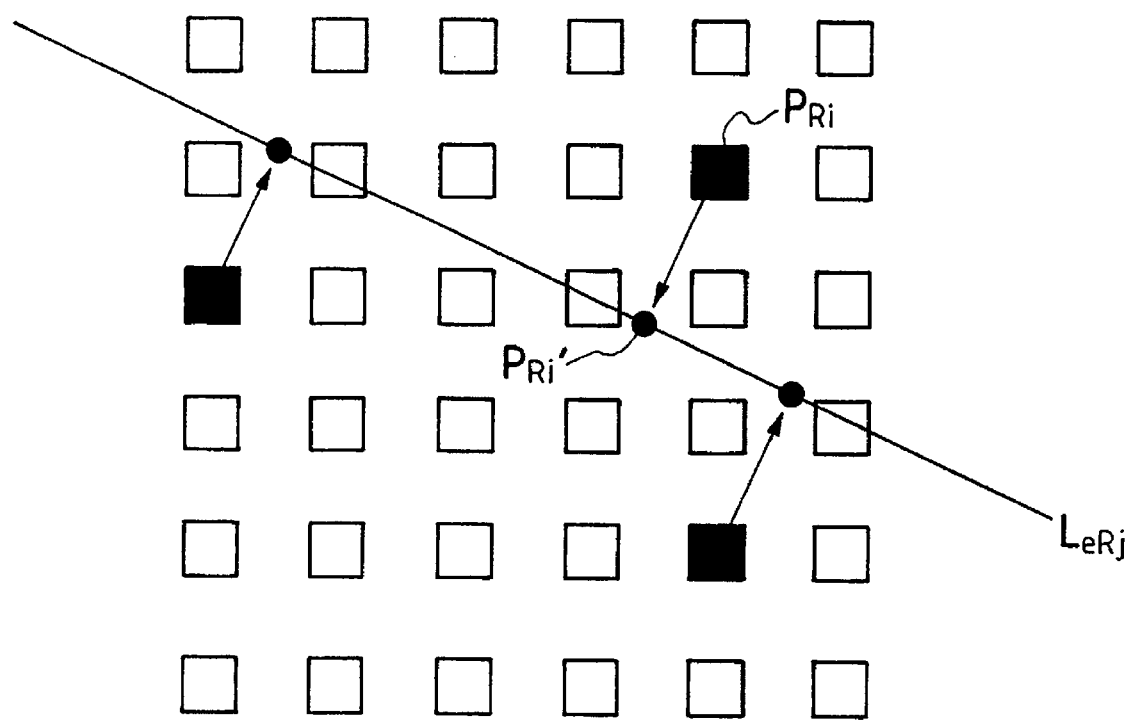
FIG. 7 is a view showing the operation in a step S6 shown in FIG. 2.

Then the candidate corresponding points $P_{Ri}$, not eliminated in the foregoing step S5, are re-arranged on the determined right epipolar line $L_{eRj}$, on which the corresponding points should be positioned (step S6). Said rearrangement can be achieved by determining a point $P_{Ri}'$, on the right epipolar line $L_{eRj}$, of shortest distance from the candidate corresponding point $P_{Ri}$ and shifting the candidate corresponding point $P_{Ri}$ to said determined point $P_{Ri}'$. In this manner it becomes possible to attain a sub-pixel precision, as shown in FIG. 7.

The extraction of the points corresponding to those on the left epipolar line $L_{eLj}$ is completed in this manner, but the left image is considered to contain such epipolar lines in plural number. Assuming that the left image contains m epipolar lines $L_{eLj}$, the following process is executed to obtain the correspondences over the entire image.

There is selected a point on the left-side sensor, not present on the left epipolar lines $L_{eLj}$ already subjected to the extraction of the corresponding points, and the operations of the step S2 to S6 are repeated (step S7). By repeating the above-explained operations m times, all the correspondences between the left and right images are determined, and the extraction of the corresponding points over the entire image area is completed (step S8).

In the following there will be explained a second embodiment of the first method of the present invention, for extracting corresponding points from plural images, with reference to FIGS. 8 to 11.

With respect to the points on the left epipolar line $L_{eLj}$, the corresponding points should be present on the right epipolar line $L_{Erj}$. However, there may be present certain aberration for example because of machine-to-machine difference of the left- and right-side cameras. In consideration of the foregoing, it is also possible to extract the corresponding points from plural images, instead of utilizing the right epipolar line $L_{eRj}$, by employing a straight line which approximates the distribution of the candidate corresponding points $P_{Ri}$ obtained on the right image for example by the template matching method from the points on the left epipolar line $L_{eLj}$, and by re-arranging said candidate corresponding points $P_{Ri}$ to the points $P_{Ri}'$ of shortest distances on this line.

Figure 8:
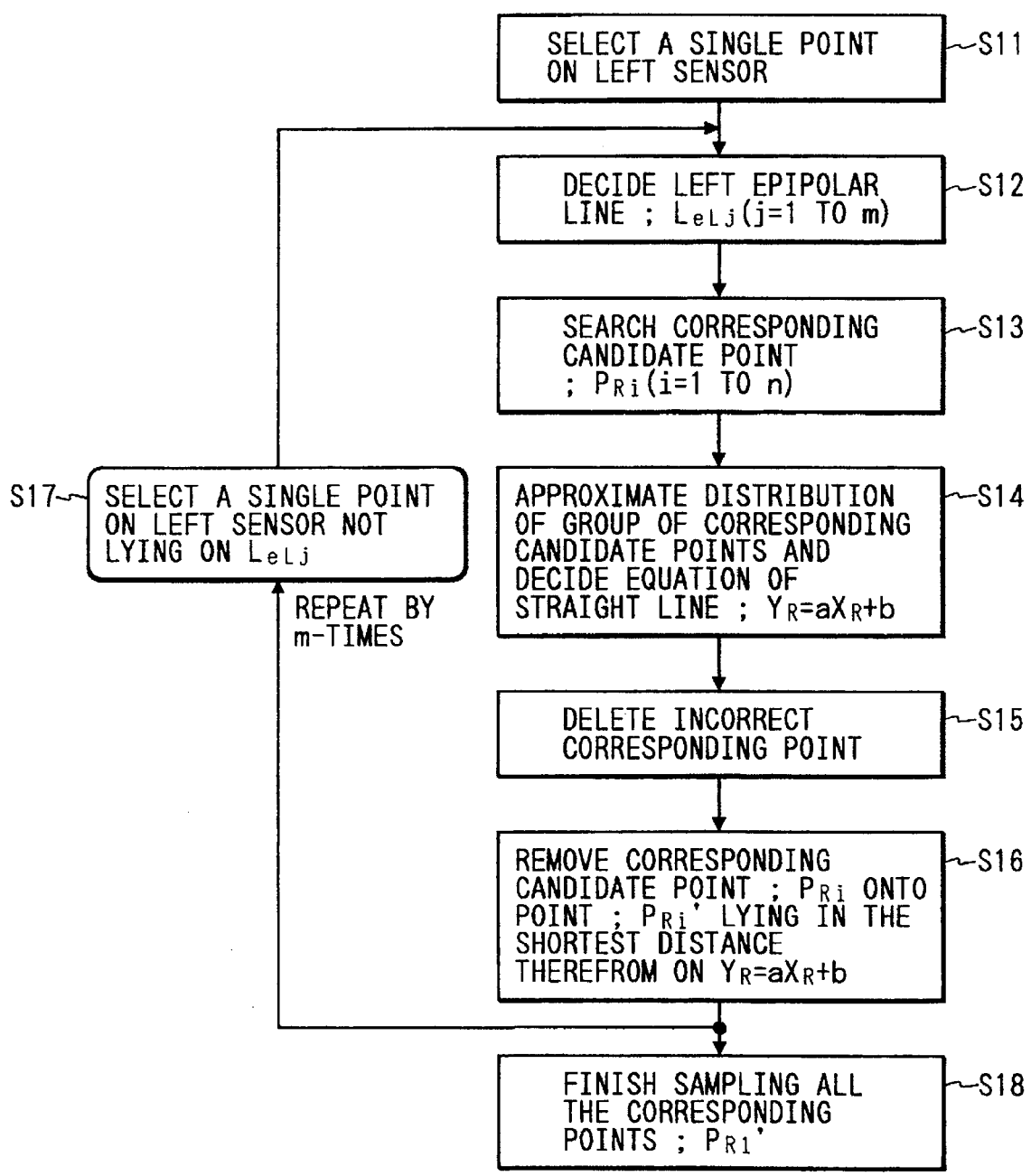
FIG. 8 is 8 flow chart showing a second embodiment of said first method of the present invention.

The method of this embodiment will be explained in more details in the following, with reference to FIG. 8.

As in the foregoing first embodiment, a point is selected on the left sensor (step S11), and a pair of epipolar lines are determined as the crossing lines between the left and right sensor planes and an epipolar plane defined by three points, namely thus selected point and the centers $O_L$, $O_R$ of the lenses of the left- and right-side cameras, whereby the left epipolar line $L_{eLj}$ is obtained (step S12). Then there are extracted crossing points $P_{Li}$ of thus obtained left epipolar line $L_{eLj}$ and the pixels on the left sensor, and, for thus extracted n crossing points $P_{Li}$ (i=1 to n), there are determined candidate corresponding points $P_{Ri}$ (i=1 to n) on the right image, for example by the template matching method (step S13).

Figure 9:
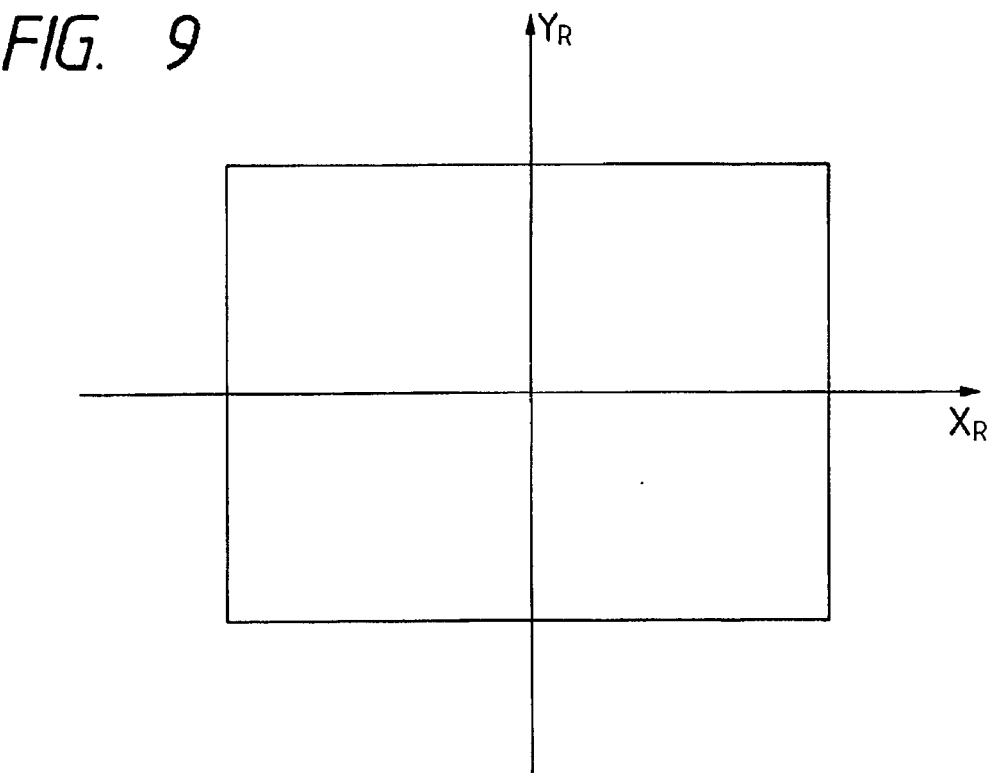
FIG. 9 is a view showing the operation in a step S14 shown in FIG. 8.
Figure 18:
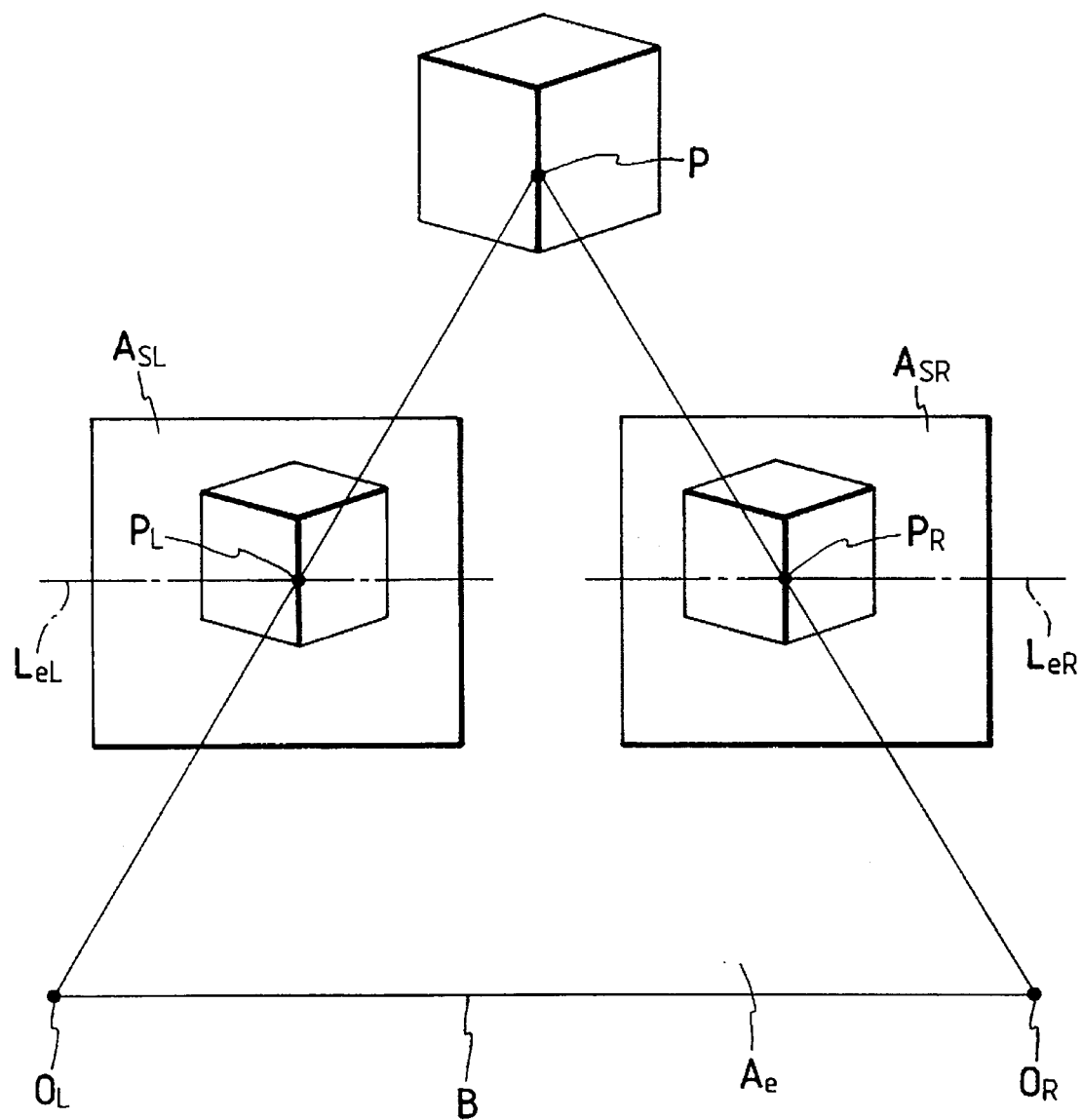
FIG. 18 is a view showing the principle of trigonometry used for determining the distance of the object.

Subsequently, coordinate axes $X_R$, $Y_R$ are selected for the right-side image as shown in FIG. 9, corresponding to those of the right sensor plane $A_{SR}$ shown in FIG. 18, and the distribution of the corresponding points is approximated by a straight line. By expressing said approximating straight line by an equation $Y_R=aX_R+b$, the distance $l_i$ between said straight line and a candidate corresponding point $P_{Ri}$ ($X_{Ri}$, $Y_{Ri}$) is represented by:

$$l_i=\{(X_R-X_{Ri})^2+(aX_R+b-Y_{Ri})^2\}^{1/2} \quad (8)$$

The straight line $Y_R=aX_R+b$ is determined by the determination of the coefficients a, b minimizing a variable E defined by:

$$E = \sum_{i=1}^{n} l_i$$

(step S14).

Any candidate corresponding point, significantly distant from said straight line $Y_R=aX_R+b$ in comparison with other candidate corresponding points, can be considered as an erroneous corresponding point and is therefore eliminated in order to improve the reliability (step S15). The elimination of such erroneous corresponding point can be achieved by regarding the candidate corresponding point $P_{Ri}$ as an erroneous point to be eliminated when the distance $l_i$ determined by the foregoing equation (8) exceeds a certain threshold value Th. Said threshold value Th can be selected arbitrarily, but it may be selected, as an example, as several times of the average distance defined by:

$$\sum_{i=1}^{n} l_i/n$$

Also such elimination can be achieved by other methods, for example by calculating the deviation in the distribution of the candidate corresponding points and eliminating the points whose deviations do not fall within a predetermined range.

Figure 10:
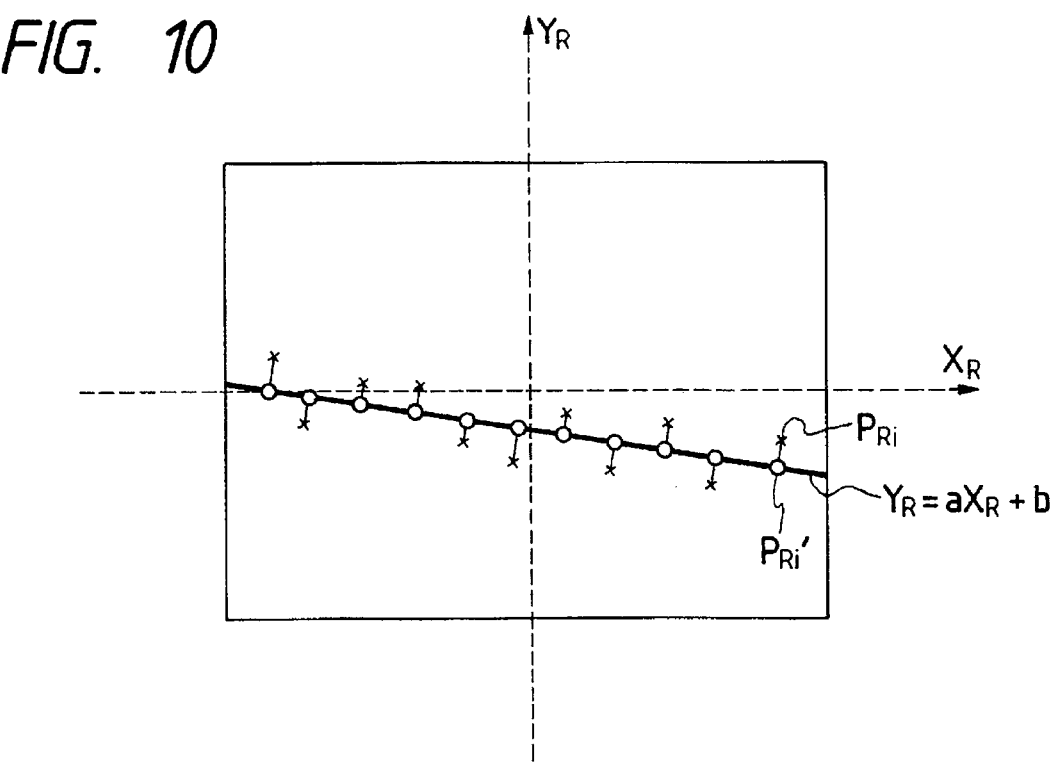
FIGS. 10 and 11 are views showing the operation in a step S16 shown in FIG. 8.
Figure 11:
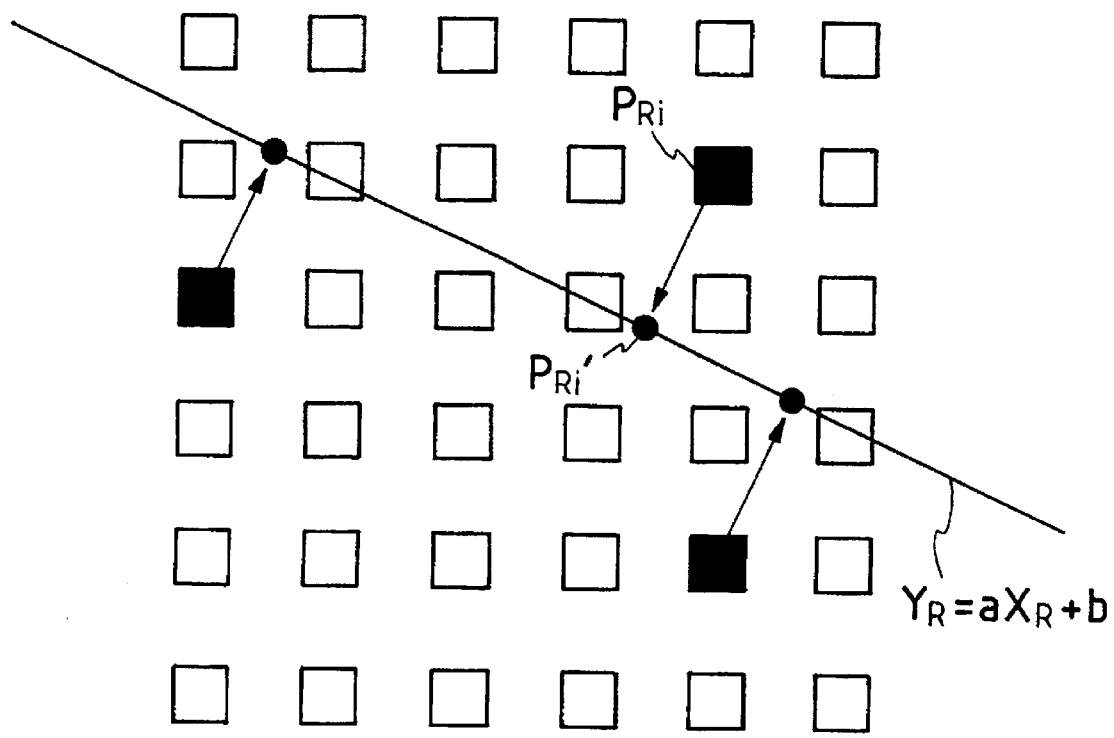

Subsequently the candidate corresponding points $P_{Ri}$, not eliminated in the foregoing step S15, are rearranged on the straight line $Y_R=aX_R+b$ on which the corresponding points should be present (step S16). This can be achieved, as shown in FIG. 10, by determining a point $P_{Ri}'$, on the straight line $Y_R=aX_R+b$, closest to the point $P_{Ri}$ and shifting the candidate corresponding point $P_{Ri}$ to thus determined point $P_{Ri}'$. In this manner it is made possible to attain a subpixel precision, as shown in FIG. 11.

The extraction of the points corresponding to those on the left epipolar line $L_{eLj}$ is completed in this manner, but the left image is considered to contain such epipolar lines in plural number. Assuming that the left image contains m epipolar lines $L_{eLj}$, the following process is executed to obtain the correspondences over the entire image.

There is selected a point on the left-side sensor, not present on the left epipolar lines $L_{eLj}$ already subjected to the extraction of the corresponding points, and the operations of the steps S12 to S16 are repeated (step S17). By repeating the above-explained operations m times, all the correspondences between the left and right images are determined, and the extraction of the corresponding points over the entire image area is completed (step S18).

The erroneous corresponding point, to be eliminated in the step S15, should also be identifiable a significantly longer distance between the adjacent two candidate corresponding points, in comparison with the distances of other points. Therefore, such candidate corresponding point, if present, may be eliminated prior to the determination of the straight line $Y_R=aX_R+b$, whereby the level of approximation of said straight line can be improved.

In the foregoing embodiments, explanation has been limited to the use of the template matching method for extracting the corresponding points from plural images, but a similar effect can be attained also with other extracting methods, such as the cooperative algorithm. Also, in case the epipolar line does not become straight for example because of the aberrations of the lens of the camera, a similar effect can be attained by executing the above-explained process also on the right-side image, and repeating plural times the process on the left-side image and that on the right-side image.

Figure 12:
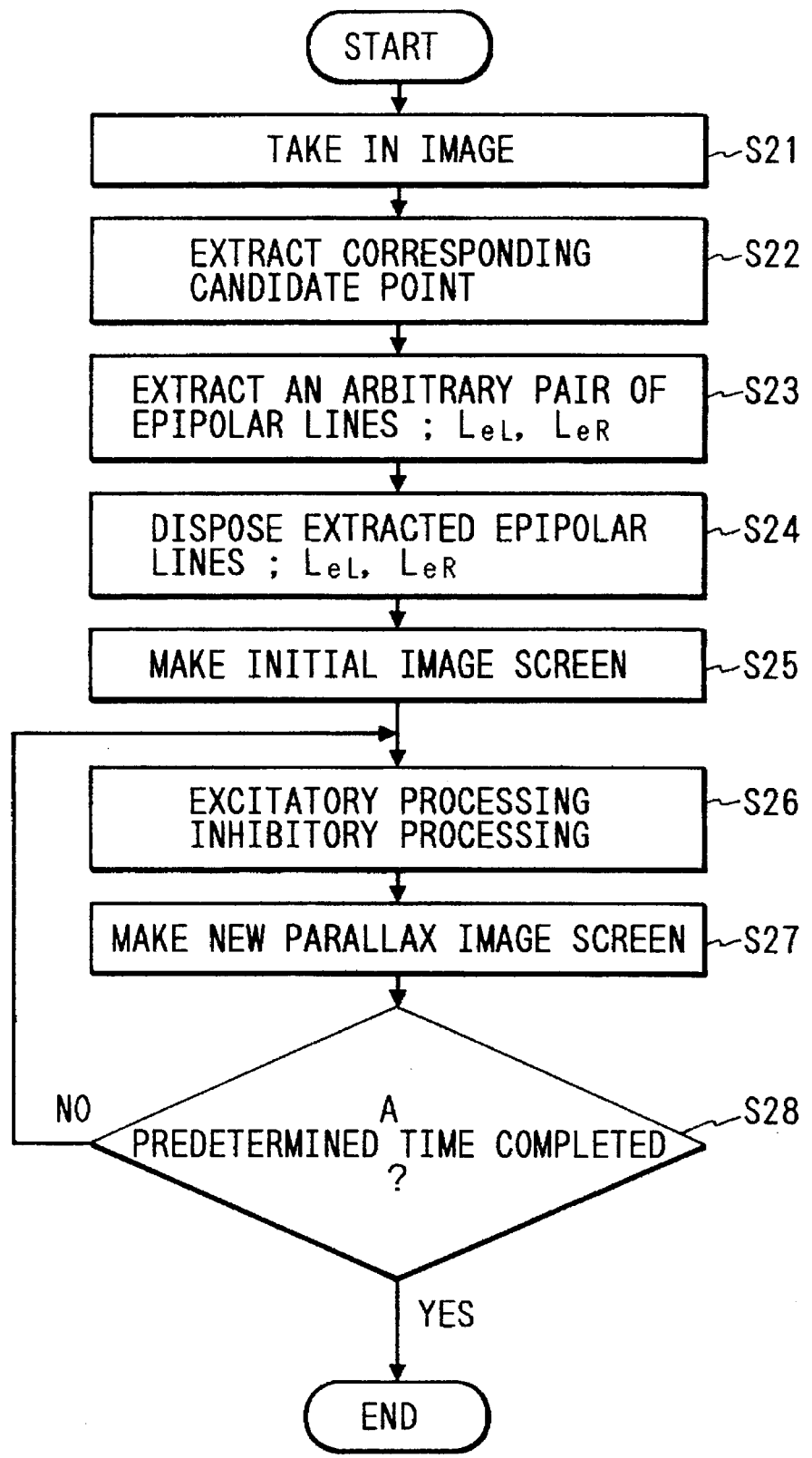
FIG. 12 is a flow chart showing the basic concept of a second method of the present invention, for extracting the corresponding points from plural images.

FIG. 12 is a flow chart, showing the basic concept of a second method of the present invention, for extracting corresponding points from plural images. In the following there will be described the extraction of corresponding point with a precision of a unit of pixel, from a pair of binary images obtained with a multi-eye image taking system.

At first, images are fetched from the multi-eye image taking system, whereby left and right binary images are obtained (step S21). Then the extraction of the corresponding points by the template matching method is conducted on said binary images, thereby determining candidate corresponding points (step S22). Also from the binary images obtained in the step S21, there is extracted an arbitrary set of left and right epipolar lines $L_{eL}$, $L_{eR}$ (step S23), which have the corresponding relationship determined in the step S22.

Figure 13:
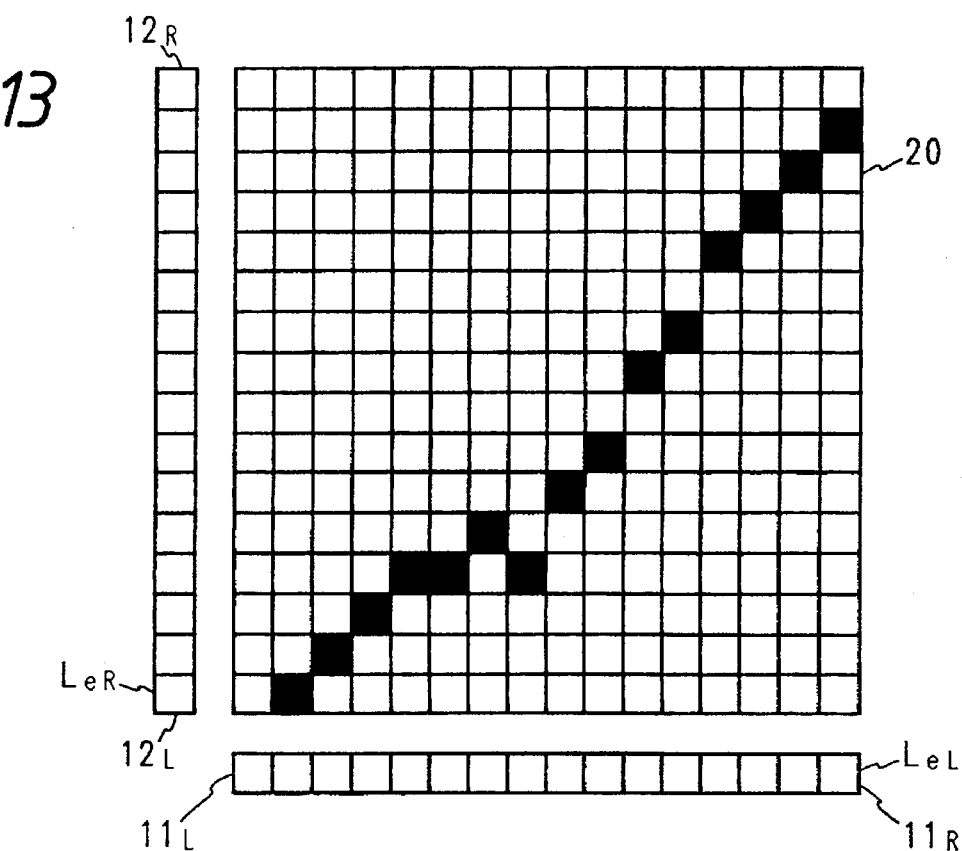
FIG. 13 is a view showing the operation in a step S24 shown in FIG. 12.

Then the extracted epipolar lines $L_{eL}$, $L_{eR}$ are arranged as shown in FIG. 13 (step S24). More specifically, the left epipolar line $L_{eL}$ is placed in the horizontal direction, with its left-hand end $11_L$ at the left and its right-hand end $11_R$ at the right, while the right epipolar line $L_{eR}$ is placed in the vertical direction, with its left-hand end $12_L$ at the bottom and its right-hand end $12_R$ at the top. Subsequently an initial image frame 20, including the initial value of the parallax image frame, is prepared, according for example to the information on the candidate corresponding points among the pixels of the left and right epipolar lines $L_{eL}$, $L_{eR}$. As there are various methods for selecting the initial values for said parallax image frame, the details will be explained in the following embodiments.

Figure 32:
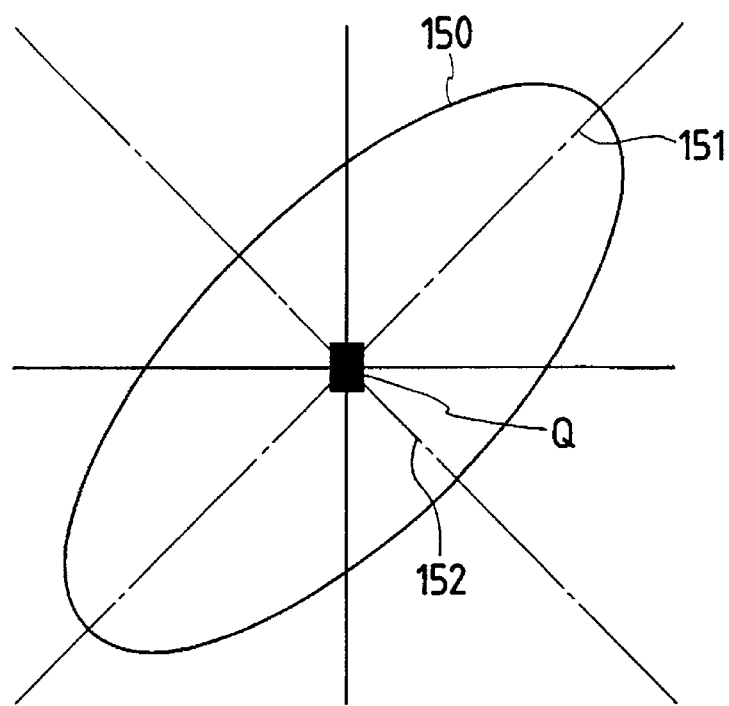
FIG. 32 is a view showing the range of excitatory and inhibitory couplings in the cooperative algorithm.
Figure 33:
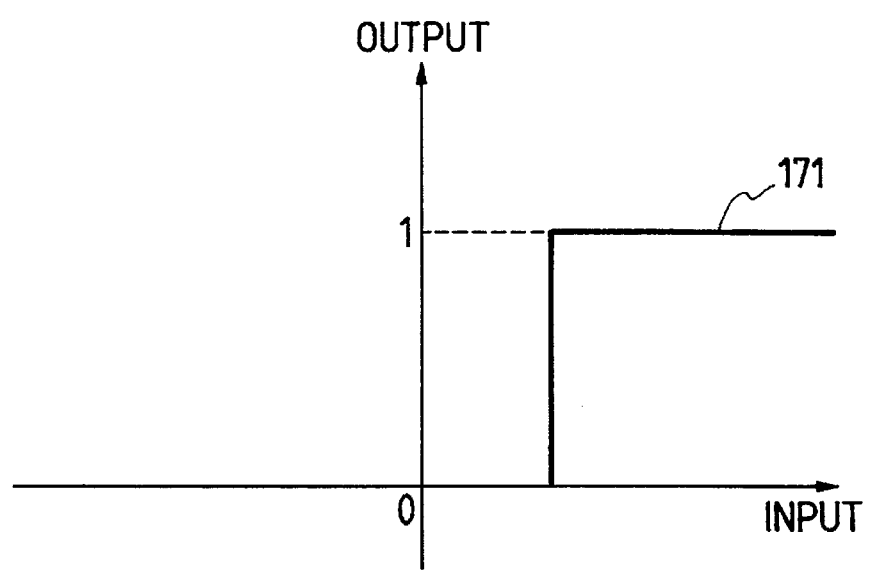
FIG. 33 is a chart showing an example of the binary output threshold function.
Figure 34:
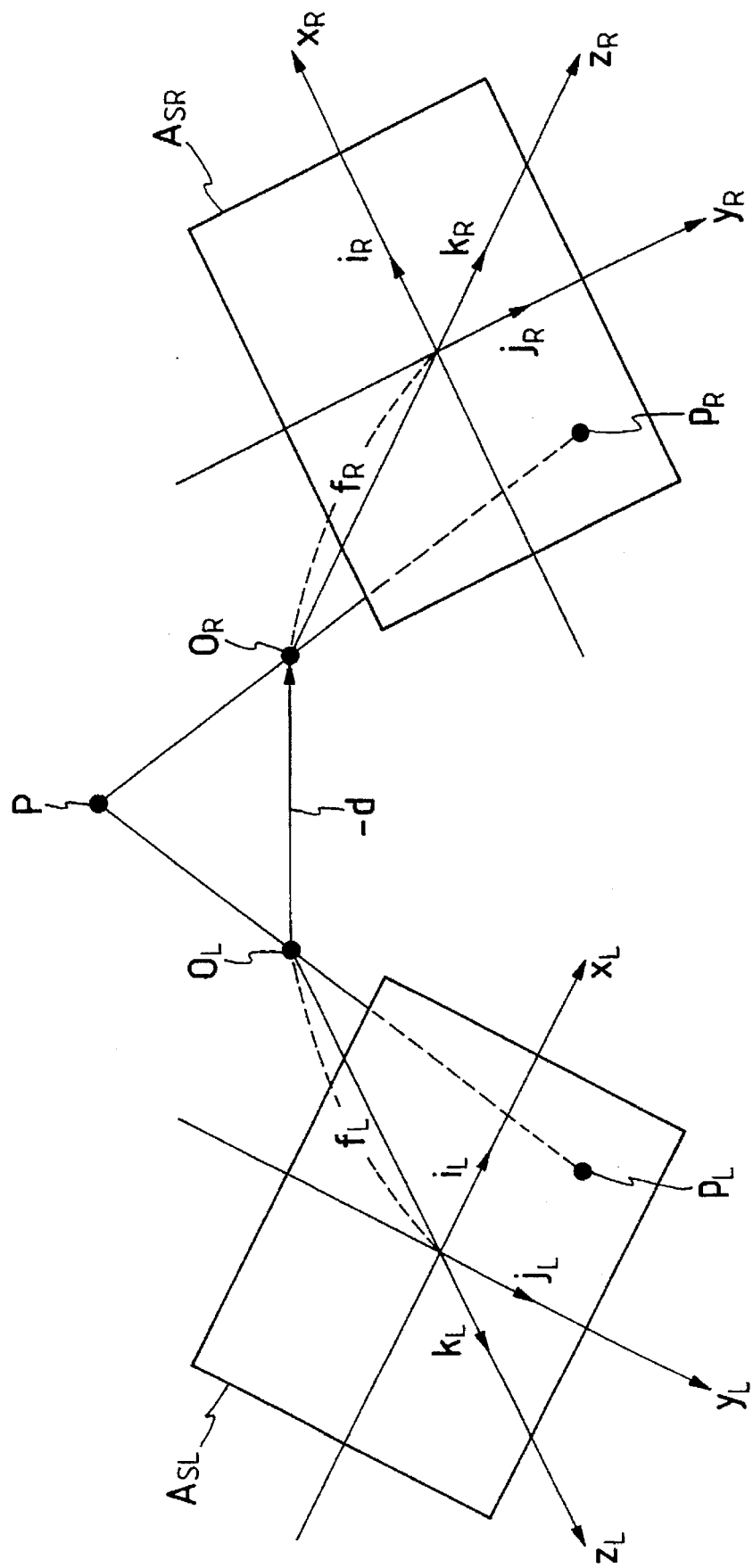
FIG. 34 is a view showing the method of extracting a set of epipolar lines.

Subsequently a local process, involving excitatory and inhibitory couplings based on real pixels, is executed on each black point in thus prepared initial image frame 20 (step S26). In this operation, the excitatory coupling based on real pixels is applied to each of the crossing points, present in an ellipse having, as shown in FIG. 32, the center at an arbitrary black point in the initial image frame 20, the longer axis along a line of 45° toward upper right, and the shorter axis along a line of −45° toward bottom right. Also the inhibitory coupling based on the real pixels is applied to each of the crossing points present 5 horizontally and vertically with respect to the black point. Then a predetermined process, employing a binary-output threshold function as shown in FIG. 33, is executed on each of the crossing points in the initial image frame 20, subjected to the local process in involving the excitatory and inhibitory couplings based on the real pixels, whereby a new parallax image frame is prepared (step S27).

Then there is discriminated whether the steps S26 and S27 have been executed for a predetermined number of times (step S28), and, if not, the process of the steps S26 and S27 are repeated, utilizing the new parallax image frame prepared in the step S27 as the initial image frame. As a result, a parallax line is finally obtained on the new parallax image frame prepared in the step S27, and the corresponding points can be extracted by means of said parallax line.

The discrimination in the step S28 may be replaced by repetition of the processes of the steps S26 and S27, utilizing a new parallax image frame, prepared in the preceding step S27, as the initial image frame until the convergence is reached at the values of the crossing points in the parallax image frame. Also the parallax line can be obtained from another set of epipolar lines $L_{eL}$, $L_{eR}$ in the two binary images taken in the step S21, by repeating the operations of the steps S23 to S28.

In the following there will be given detailed explanation on the selection of initial values at the preparation of the initial image frame 20 in the foregoing step S25, by first to third embodiments.

In a first embodiment of the second method of the present invention, for extracting the corresponding points from plural images, the initial image frame is prepared solely from the correspondence information obtained by the template matching method. More specifically, a parallax image frame as shown in FIG. 13 can be obtained by forming a black dot at a position on the parallax image plane where each pixel on the left epipolar line $L_{eL}$ meets the pixel of strongest correlation (candidate corresponding point) in the right epipolar line $L_{eR}$. Thus obtained parallax image frame is used as the initial image frame 20 in the operations starting from the step S26 in FIG. 12.

Figure 17:
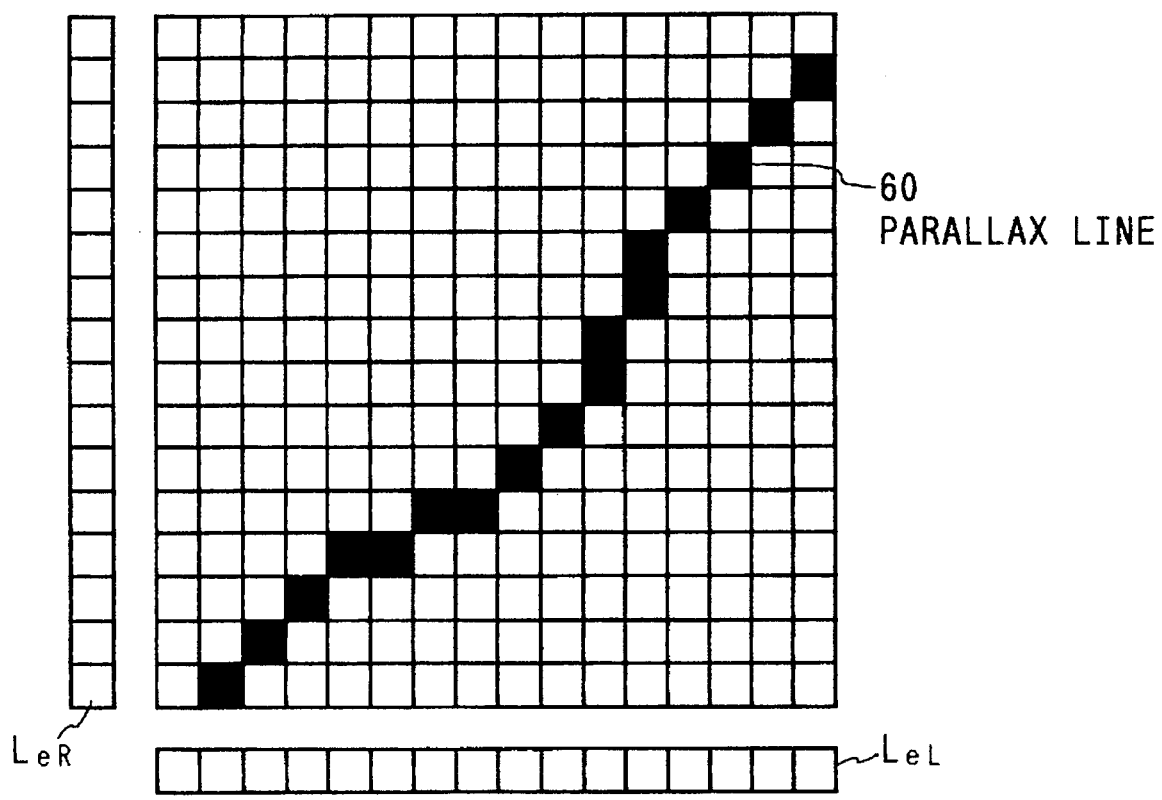
FIG. 17 is a view showing an example of the finally obtained parallax line.

This method allows to reduce the time required for processing, since the arrangement of black dots in the initial image frame 20 is close to the final form of the parallax line as shown in FIG. 17. Also the reliability can be improved as the erroneous correspondences, contained in plural black dots in the initial image frame 20, can be eliminated by the step S26 shown in FIG. 12.

In a second embodiment of the second method of the present invention, the initial values of the parallax image frame are selected according to the "AND" relationship shown in Table 1, from the ordinary initial values and the initial values based solely on the information on the candidate corresponding points. The "ordinary initial values" mean the initial values obtained, as already explained in the conventional cooperative algorithm, by forming black points on the parallax image plane at all the crossing points between the "black" pixels on the left epipolar line $L_{eL}$ and those on the right epipolar line $L_{eR}$.

TABLE 1

| Left/right epipolar line pixel | | | Initial value assigned | | | |
|---|---|---|---|---|---|---|
| Left | Right | Candidate corresponding relation | Ord. Ini. value | Candidate cor. point | AND | OR |
| black | black | present | black | black | black | black |
| black | white | present | white | black | white | black |
| white | black | present | white | black | white | black |

TABLE 1-continued

| Left/right epipolar line pixel | | | Initial value assigned | | | |
|---|---|---|---|---|---|---|
| Left | Right | Candidate corresponding relation | Ord. Ini. value | Candidate cor. point | AND | OR |
| white | white | present | white | black | white | black |
| black | black | none | black | white | white | black |
| black | white | none | white | white | white | white |
| white | black | none | white | white | white | white |
| white | white | none | white | white | white | white |

Figure 14:
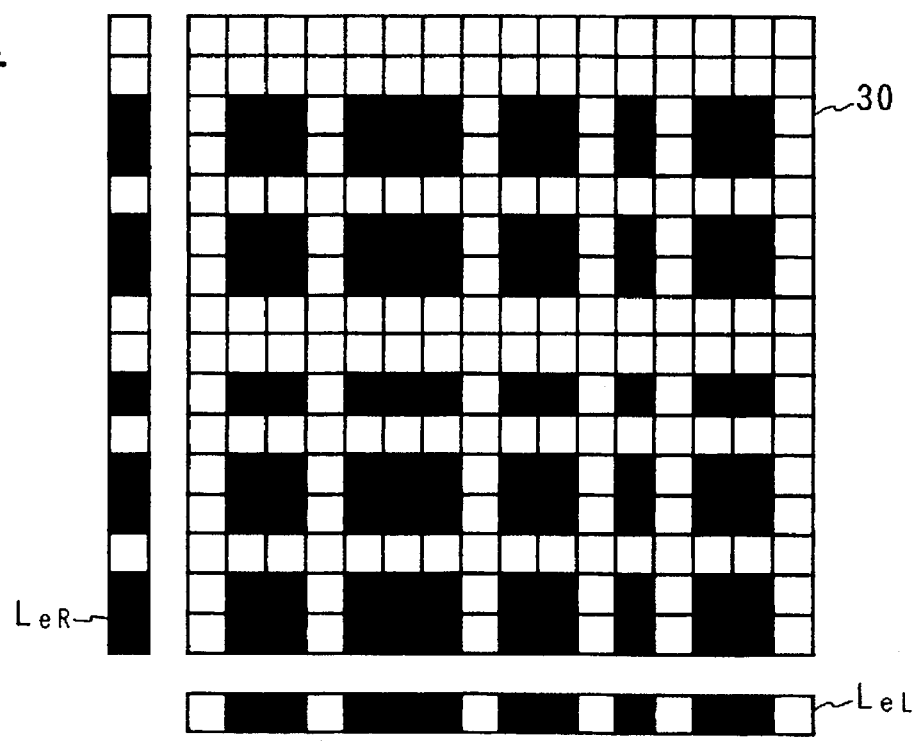
FIG. 14 is a view showing the method of selecting the initial value in the preparation of an initial image frame, in a second embodiment of the second method of the present invention.
Figure 15:
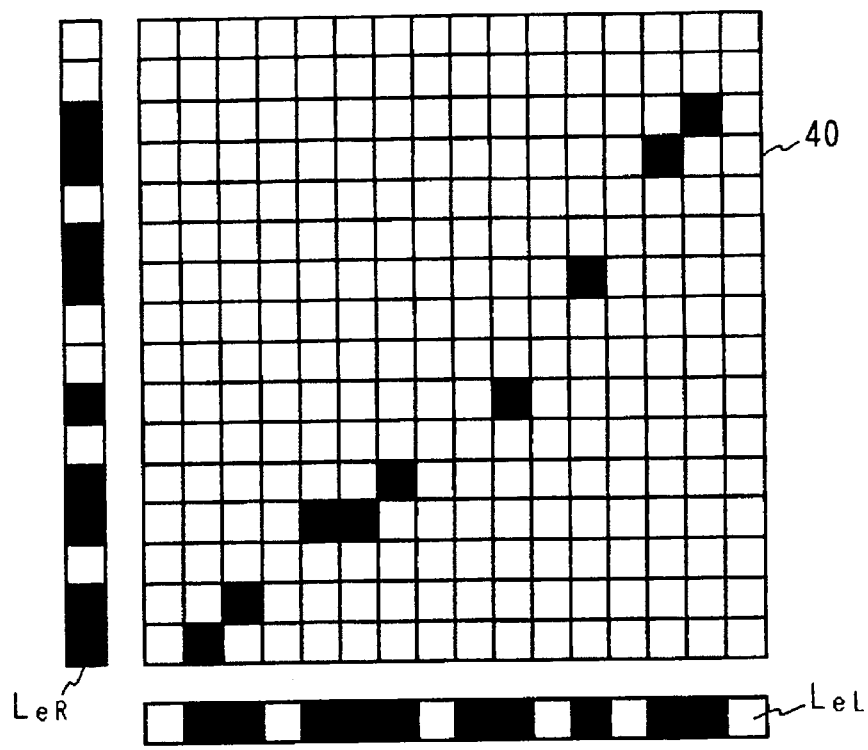
FIG. 15 is a view showing an example of the initial image frame prepared in the second embodiment of the second method of the present invention.
Figure 16:
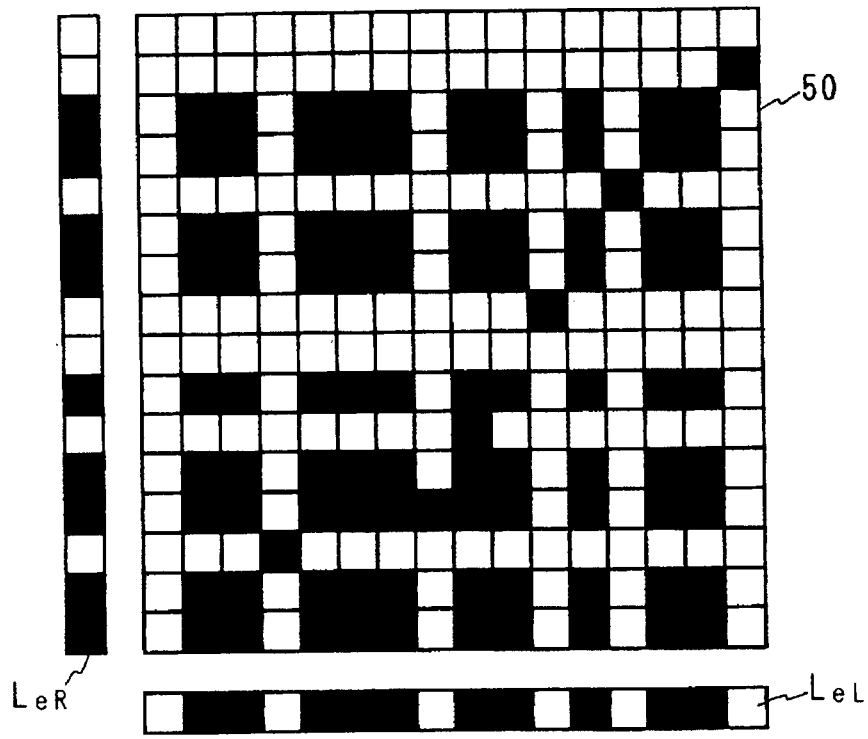
FIG. 16 is a view showing an example of the initial image frame prepared in a third embodiment of the second method of the present invention.

When the left and right epipolar lines $L_{eL}$, $L_{eR}$ have the black and white pixel values as shown in FIG. 14, the initial image frame 30 based on the "ordinary initial values" is given in a form shown in FIG. 14. Then an initial image frame 40 as shown in FIG. 15 is prepared by forming a black dot at each crossing point, which is black in the initial image frame 30 and is also black on the initial image frame 20, shown in FIG. 13, based on the candidate corresponding points obtained by the template matching method. Thereafter the operations starting from the step S26 in FIG. 12 are executed, thereby obtaining the final parallax line as shown in FIG. 17.

Also this embodiment provides the effects similar to those in the foregoing first embodiment of the second method of the present invention, and an additional advantage of eliminating, among the candidate corresponding points, those evidently different in the left and right pixel values, prior to the process according to the cooperative algorithm.

In a third embodiment of the second method of the present invention, the initial values of the parallax image plane are selected according to the "OR" relationship, shown in Table 1, from the ordinary initial values and the initial values solely based on the candidate corresponding point information.

More specifically, an initial image frame 50 is prepared by forming black dots both at the black crossing points on the initial image frame 30 prepared according to the ordinary initial values as shown in FIG. 14, and at the black crossing points on the initial image frame 20, in FIG. 13, prepared according to the candidate corresponding point information obtained by the template matching method. Thereafter the operations starting from the step S26 shown in FIG. 12 are executed to finally obtain the parallax line 60 as shown in FIG. 17.

Also this embodiment, provides similar effects as those in the foregoing first embodiment of the second method of the present invention, and also widens the range of search for the corresponding points, thereby enabling extraction of the corresponding points with improved reliability.

In Table 1, the column "left/right pixel value" indicates the pixel value ("black" or "white") on the left epipolar line $L_{eL}$ and on the right epipolar line $L_{eR}$. The column "candidate corresponding relationship" indicates whether the candidate corresponding relationship is "present" or "none" between the left and right pixels. The column "initial value assigned" indicates the value ("black" or "white") assigned to the crossing point of the left and right pixels on the parallax image plane. The column "ordinary initial value" indicates the method of initial value assignment, in which "black" is assigned only when the left and right pixels are both black. The column "candidate corresponding point" indicates the method of initial value assignment in the first embodiment, in which "black" is assigned to the crossing point where the candidate corresponding relationship is "present". The column "AND" indicates the method of initial value assignment in the second embodiment, in which "black" is assigned only to the crossing point which is classified as "black" both in the column "ordinary initial value" and in the column "candidate corresponding point". Also the column "OR" indicates the method of initial value assignment in the third embodiment, in which "black" is assigned to the crossing point indicated as black in the column "ordinary initial value" or in the column "candidate corresponding point".

In the foregoing description, there has been explained the application of the first and second methods of the present invention to a binary image, but such methods may also be applied to an image involving gradation, for example by combination with a method of representing each pixel of the epipolar lines by an intermediate value and also representing each crossing point in the parallax image plane by an intermediate value, as disclosed in the Japanese Patent Application No. 4-288371.

What is claimed is:

1. A method for extracting corresponding points from plural images comprising:

a step of picking up an image of a surface of an object by a first image pick-up means to obtain a first image;

a step of picking up an image of said surface of said object by a second image pick-up means to obtain a second image;

a step of extracting a first epipolar line in said first image;

a step of obtaining a group of corresponding candidate points in said second image which corresponds to a group of points on said first epipolar line by a predetermined calculation process;

a step of moving a set of points from said group of corresponding candidate points onto a line set in said second image according to a predetermined rule to convert said group of corresponding candidate points into a group of points arranged on said line set in said second image, wherein said set of points includes only those points from said group of corresponding candidate points whose distances to said line set in said second image are smaller than a predetermined threshold value, while those points whose distances to said line set in said second image are larger than the predetermined threshold value are eliminated from said move;

a step of regarding said group of points arranged on said line set in said second image as a group of corresponding points of said second image corresponding to said group of points on said first epipolar line; and a step of using a reference point corresponding to an objected point on said surface of said object and a corresponding point on said line set in said second image corresponding to said reference point on said first epipolar line to calculate an information of distance to said objected point.

2. A method according to claim 1, wherein said set fine is an epipolar fine extracted from said second image.

3. A method according to claim 1, wherein said set fine is a set fine approximating the arrangement of said group of corresponding candidate points.

4. A method of extracting corresponding points from plural images comprising:

a step of picking up an image of a surface of an object by a first image pick-up means to obtain a first image;

a step of picking up an image of said surface of said object by a second image pick-up means to obtain a second image;

a step of obtaining a group of corresponding candidate points corresponding to a group of points in said first image, in said second image by a first corresponding point extracting process;

a step of obtaining a group of intersection points in which a group of points on a first epipolar fine of said first image and a group of points on a second epipolar line of said second image are intersected on a parallax image plan formed by using said first epipolar fine and said second epipolar fine;

a step of obtaining a parallax fine in said parallax plane by executing a local process involving excitatory coupling and inhibitory coupling for said group of intersection points;

a step of obtaining a group of corresponding points corresponding to said group of points in said first image, in said second image by a second corresponding point extracting process in which said parallax line is used, wherein said group of corresponding candidate points obtained by said first corresponding point extracting process different from said second corresponding point extracting process is used when said group of corresponding points is obtained by said second corresponding point extracting process; and a step of using a reference point in said first image corresponding to an objected point of said surface of said object and a corresponding point corresponding to said reference point in said second image to calculate an information of distance to said reference point.

5. A method according to claim 4, wherein said first corresponding point extracting process includes a template matching process.

* * * * *

UNITED STATES PATENT AND TRADEMARK OFFICE
CERTIFICATE OF CORRECTION

PATENT NO. : 5,655,033
DATED : August 5, 1997
INVENTOR(S) : Kazutaka Inoguchi, et al.

It is certified that error appears in the above-indentified patent and that said Letters Patent is hereby corrected as shown below:

Col. 2, line 13, change "$(X_n, Y_n, Z_n)$" to -- $(X_n, Y_n, Z_n)$ --.

Col. 2, line 46, change "$(x_n \, L_s/2 -$" to -- $(x_n + L_s/2) -$ --.

Col. 4, line 62, change "$a_n$" to -- $a_n$ --.

Col. 6, line 24, change " G" to -- $\sigma$ --.

Col. 7, line 7, change "VL" to -- $V_L$ --.

Col. 9, line 27, change "8", second occurrence, to -- a --.

Col. 10, line 49, change "Fi$_G$." to -- Fig. --.

Col. 10, line 53, delete "10".

Col. 18, line 5, change "fine" to -- line --.

Col. 18, line 6, change "fine" to -- line --.

UNITED STATES PATENT AND TRADEMARK OFFICE
CERTIFICATE OF CORRECTION

PATENT NO. : 5,655,033
DATED : August 5, 1997
INVENTOR(S) : Kazutaka Inoguchi, et al.

It is certified that error appears in the above-indentified patent and that said Letters Patent is hereby corrected as shown below:

Col. 18, line 7, change "fine" to -- line --.

Col. 18, line 8, change "fine" to -- line --.

Signed and Sealed this

Sixteenth Day of June, 1998

*Attest:*

BRUCE LEHMAN

*Attesting Officer*  Commissioner of Patents and Trademarks